United States Patent [19]
Perret et al.

[11] Patent Number: 5,948,295
[45] Date of Patent: Sep. 7, 1999

[54] AUTOMATIC MACHINE FOR TRANSVERSAL CONNECTION OF METALLIC BANDS

[75] Inventors: Jean Perret, Montbrison; Marc Valence, Courbevoie; Brahim Zennaf, Saint-Etienne; Jean-Pierre Rivollier, Saint-Chamond, all of France

[73] Assignee: Kvaerner Metals Clecim, Paris, France

[21] Appl. No.: 08/979,569

[22] Filed: Nov. 26, 1997

[30] Foreign Application Priority Data

Nov. 29, 1996 [FR] France ................... 96 14709

[51] Int. Cl.$^6$ ............... B23K 9/00; B23K 37/00
[52] U.S. Cl. ................... 219/125.1; 228/5.7
[58] Field of Search ............ 228/5.7; 219/101, 219/102, 104, 105, 125.1

[56] References Cited

U.S. PATENT DOCUMENTS

| | | | |
|---|---|---|---|
| 3,632,035 | 1/1972 | Wheeler | 219/78 |
| 3,915,368 | 10/1975 | Ulmer | 228/13 |
| 4,067,489 | 1/1978 | Ishioka et al. | 228/5.7 |
| 4,597,521 | 7/1986 | Wilson | 228/160 |
| 5,125,554 | 6/1992 | Geiermann et al. | 228/5.7 |
| 5,871,138 | 2/1999 | Shishido et al. | 228/5.7 |

FOREIGN PATENT DOCUMENTS

| | | |
|---|---|---|
| 0 135 133 | 3/1985 | European Pat. Off. . |
| 0 661 112 | 7/1995 | European Pat. Off. . |
| 2 703 274 | 10/1994 | France . |

*Primary Examiner*—Patrick Ryan
*Assistant Examiner*—Anjan Dey
*Attorney, Agent, or Firm*—Nikaido, Marmelstein, Murray & Oram LLP

[57] ABSTRACT

A splicing machine for connecting metallic bands including at least three toolings determining successively the cutting profile of both edges (m1, m2) to be connected, the welding of both edges on to one another and the flattening of the welded matter in excess. The machine includes a tool carriage (3) mounted to slide parallel to the running direction of the bands (M1, M2) on which are mounted to slide, perpendicular to the running direction, at least two supporting chassis (41, 51), each for one of the connecting toolings (4,5), a motor and a worm (32) for positioning either connecting tooling (4,5) in a common working position, by sliding the tool carriage (3) and apparatus to control the transversal sliding motion of the corresponding tooling for the actuation of the latter.

31 Claims, 12 Drawing Sheets

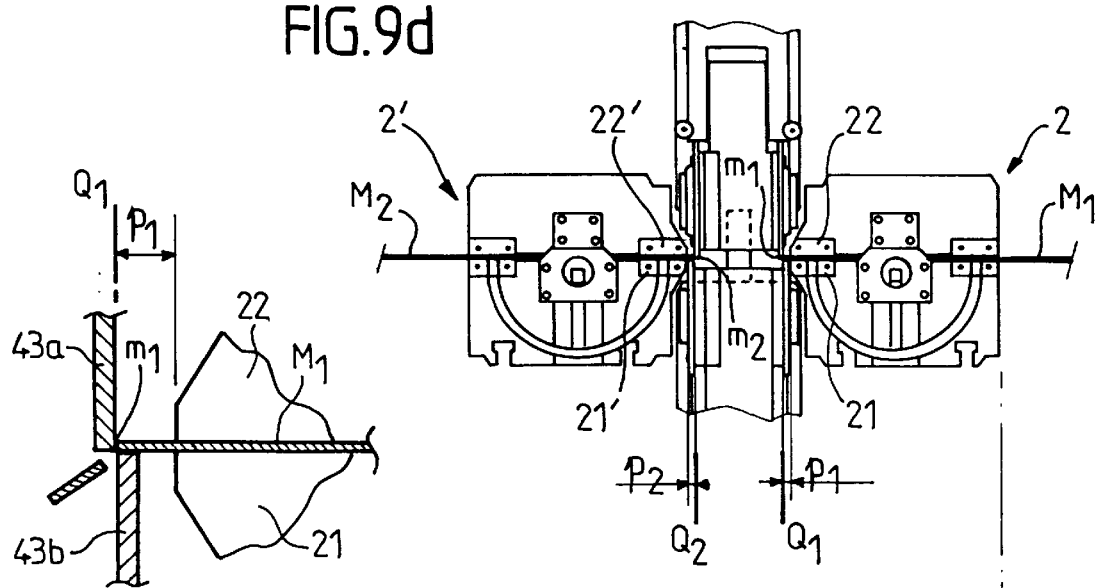
FIG.9d
FIG.9d'
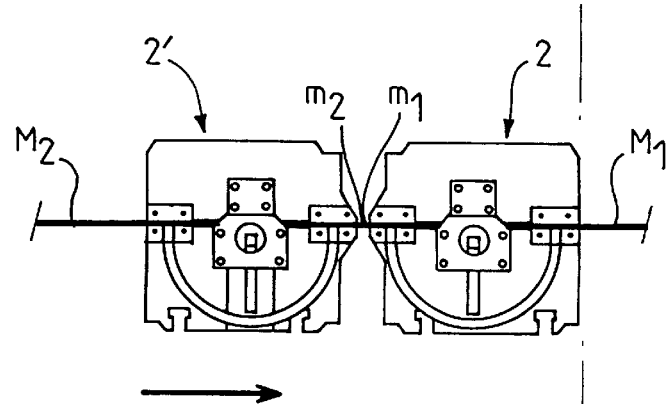
FIG.9e
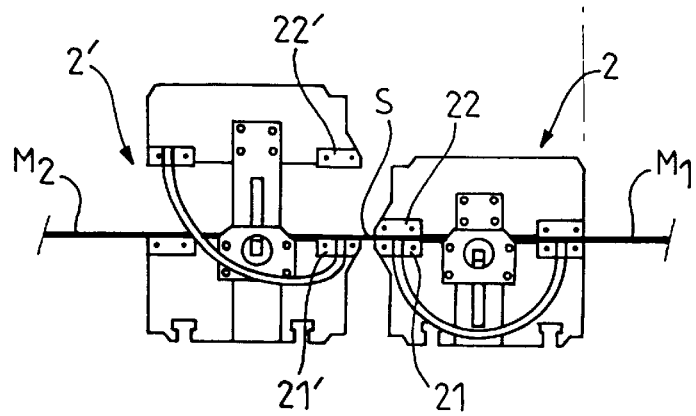
FIG.9f

AUTOMATIC MACHINE FOR TRANSVERSAL CONNECTION OF METALLIC BANDS

FIELD OF THE INVENTION

In metallurgical installations, especially for producing metallic bands, one often has to weld the bands in succession by an electric process. For instance, in rolling installations, the rolled bands are generally wound into reels before going to the next operation. In order to perform a continuous task, for instance in finishing lines, the downstream extremity of a band must be welded, in the running direction, at the end of the process to the upstream extremity of the following band. In such a case, the welding process must follow a transversal line, generally perpendicular to the running axis,

BACKGROUND OF THE INVENTION

Various means are used to this end. One can, for instance, apply the extremity of two bands one onto the other and weld them by passing electric current between two knurls moving transversally.

But, in some cases, both bands must be butt-welded so as not to produce excessive thickness. Both extremities, respectively downstream and upstream, of both bands must be shorn off, along two perfectly parallel lines, then brought closer to one another so that the opposite edges contact each other, thus producing a flash welding.

Such an installation therefore comprises various tools working successively and arranged, generally, one after the other along a longitudinal running direction of the bands.

First of all, the extremities, respectively downstream and upstream of the first and of the second bands are shorn off by a cutting tool which can advantageously comprise two shears working simultaneously and spaced by a constant distance in order to perform, at the extremities of both bands, two perfectly parallel edges, whereby both bands are maintained, as they are shorn off, by clamping grips mounted on a fixed frame.

Then, both shorn off edges are brought closer to one another and flash welded. During this operation, both extremities are maintained in clamping grips and, generally, a so-called cantilever distance is left between each pair of clamping grips and the corresponding edge to allow the welding operation to take place.

Moreover, it is necessary to apply the extremities of both bands one upon the other under a certain pressure in order to produce a forging effect during welding.

To this end, it is therefore used a welding machine comprising two pairs of clamping grips linked to a source of electric current and mounted, respectively, on a fixed frame and on a mobile frame moving longitudinally with respect to the fixed frame in order to bring both bands and the welding forging closer to one another.

However, the welding bead forms, on both faces of the band, fatty pads which must be eliminated so as not to disturb the passage of the welded section in the different sections of the processing machine. This is the reason why the machine usually comprises a tooling for flattening the welded spot consisting, most of the time, of a planing machine provided with knives to eliminate the beads, by transversal displacement along the welded spot.

Besides, the machine is provided with a number of auxiliary devices, for instance one or several looping devices giving a certain freedom to longitudinally displace each band without acting on the running means, centring means for perfect alignment of both bands, as well as a notching device in order to eliminate the extremities of the welded spot on the lateral edges of both bands, especially when the latter are not identical in width.

Such installations are therefore rather complicated and very cumbersome, whereas the toolings are usually located one after the other according to the order of operations to be performed.

In order to simplify the operations, it has already being suggested to associate the cutting tooling to the welding machine.

In such a case, the extremities of both bands must be clamped in both pairs of clamping grip before being shorn off, then one must release the grips in order to adjust the cantilever distances, tighten the grips again, adjust the distance between the opposite edges and proceed to the welding while exerting a forging pressure.

Then, both welded bands must be moved to the flattening tooling which also comprises clamping means in order to maintain the welded bands during the planing operation.

All these operations must be performed with great accuracy, for instance, by placing distance adjustment blocks between the extremities of both bands.

SUMMARY OF THE INVENTION

The purpose of the invention is to offer new arrangements in order to construct a simpler machine, less cumbersome and cheaper, with better performances.

Besides, the dispositions according to the invention enable easy positioning and centring of the bands, simplified operation and easier automation of the various tasks.

The invention therefore relates to a machine for connecting metallic bands running along a longitudinal axis and generally comprising:

a fixed frame centred on the running axis and on which is mounted a first two-grip clamping device for clamping the downstream extremity, in the running direction, of a first band, a mobile frame centred on the running axis and movable parallel to the latter with respect to the fixed frame, whereas the said movable frame carries a second two-grip clamping device for clamping the upstream extremity of a second band following the first one and, at least three toolings for the connection of the second band to the first one, respectively, a cutting tooling comprising two shears for simultaneous cutting of two opposite parallel edges, respectively downstream and upstream, on the extremities of both bands, once the latter have been clamped respectively in the first and second clamping devices, whereas each edge is shorn off at a cantilever distance determined with respect to the corresponding clamping grips, a butt-welding tooling of both bands after bringing the latter closer to one another by moving the mobile frame, a planing tooling removing the matter in excess on both faces of the welded bands.

According to the invention, the machine comprises:

a tool-carriage mounted to slide on a longitudinal guiding path extending on a first side of both frames, parallel to the running axis, at least two transversal guiding paths arranged beside one another on the tool-carriage and perpendicular to the running axis, at least two supporting chassis, each to support one of the connecting toolings, whereby the said supporting chassis are mounted to slide, respectively, each on one of the said transversal guiding paths, means to control the sliding motion of the tool-carriage along the longitudinal guiding path, to position one of the transversal guiding paths, more or less in a common working position, centred on a mean plane orthogonal to the running axis, means to control the transversal sliding motion of each of the said chassis of the supporting tooling, one after the other, on the corresponding transversal guiding path, after placing the said path into the said common working position, in order to actuate the tooling carried by the said chassis and to perform the corresponding operation, on the opposite edges, respectively downstream and upstream, of both bands.

In a particularly advantageous embodiment, the means to control the transversal sliding motion of the tooling supporting chassis, comprise common means arranged at the level of the common working position and movable perpendicular to the running axis while bearing upon a fixed structure, whereby the said common means are provided with a pick-up device capable to engage in a removable way onto an associated corresponding section of each tooling supporting chassis when the said chassis is in the common working position.

According to a preferred embodiment, the tool-carriage is mounted to move on a lower longitudinal sliding path arranged on a floor beside the machine and associated with an upper parallel sliding path arranged on a supporting structure and onto which engages a corresponding guiding section by a sliding motion, of matching shape, arranged on each tooling supporting chassis, whereas the said upper longitudinal path comprises two sections extending respectively on both sides of a stop located at the level of the common working plane and whose width is sufficient to enable transversal displacement of either tooling supporting carriage.

Advantageously, the common means for controlling the sliding motion of the supporting chassis comprise at least one jack centred on an axis parallel to the mean working plane and comprising a fixed element mounted on the supporting structure and a mobile element on which is arranged a hooking head whose profile, in transversal section, is identical to that of the upper longitudinal path so that, in the common working position of each tooling supporting chassis, the guiding section of the latter engages onto the hooking head of the jack.

Preferably, the control means of the longitudinal sliding motion of the tool-carriage comprises a thin adjustment device for accurate positioning of at least one transversal guiding path and of the corresponding supporting chassis with respect to the mean transversal sliding plane and the pick-up device of the sliding control means engages onto the matching section of each supporting chassis with a certain clearance in the longitudinal direction enabling to position the said chassis.

According to another preferential feature, the cutting tooling of the connection machine comprises two shearing devices maintained at fixed distance for cutting, respectively, the downstream extremity and the upstream extremity of both bands maintained, respectively, by the first and the second clamping devices, along two parallel shearing lines, spaced from one another by a constant distance and forming two edges, respectively upstream and downstream.

Particularly advantageously, both shearing devices are mounted on the tool-carriage and the adjustment device determines, by longitudinal displacement of the carriage, the accurate positioning of the first shearing device with respect to the first clamping device in order to adjust a set cantilever distance on the downstream extremity of the first band, between the corresponding shearing line and the first clamping device.

Moreover, the machine can be provided with means for longitudinal displacement of the mobile frame with respect to the fixed frame which enables accurate positioning of the second clamping device with respect to the first in order to adjust a set cantilever distance between the second clamping device and the shearing line at the upstream extremity of the second band.

According to a preferred embodiment, the cutting tooling comprises two shearing devices delineating respectively two parallel shearing planes spaced by a fixed distance, forming double shears carried by a common supporting chassis, mounted to slide on the tool-carriage perpendicular to the running axis and comprising two arms, respectively an upper and a lower one, extending respectively above and beneath the running plane of the band. Both shearing devices each consists of a pair of circular blades, respectively upper and lower, mounted to rotate around axes parallel to the running direction, respectively on both arms of the chassis, whereas both blades of each pair overlap each other partially on a shearing plane perpendicular to the running direction of the band.

On completion of the forward motion of the first band and before the second band is placed, both pairs of blades are placed on the side opposite the tool-carriage whereas the supporting chassis moves behind the trailing edge of the first band. The second band is then moved forward and, after the trailing and the leading edges, respectively, of the first and of the second band, have been clamped by the clamping devices and the cantilever distances adjusted, the supporting chassis is pulled onto the tool-carriage to perform the shearing operation.

Moreover, the upper blade of each pair is advantageously supported by a vertical post articulated around a horizontal axis on the supporting arm in order to pivot slightly from a first pull-shearing position, for which the axis of the upper blade is offset backwards with respect to the axis of the lower blade, in the running direction of the chassis toward the carriage, whereas the vertical post bears on a fixed stop of the supporting arm, to a second push-shearing position for which the axis of the upper blade is retracted at least in the vertical plane passing through the axis of the lower blade when the chassis is pushed away toward the bands, whereas the vertical post bears on an adjustable stop. This way, the first position enables pull-shearing, before the bands are welded, but push-shearing can also be performed after welding, in the second position, in case when the bands must be separated for re-welding.

Generally, each clamping device comprises a pair of jaws, respectively lower and upper, whereby one of the said jaws is fixed on the corresponding frame and the other jaw is mounted movable vertically on the frame, each jaw being provided with a removable clamping grip.

According to a preferred embodiment, the lower jaw is fixed on the frame and provided with a lower grip mounted to slide perpendicular to the running direction, on the lower jaw and the upper jaw is movable vertically and provided with a removable upper grip, which can be detached from the upper jaw in order to rest of the lower grip, the two-grip assembly can thus be removed from the machine and replaced into the latter whereas the lower grip slides transversally onto the lower jaw.

Advantageously, at least one of both jaws is provided with at least one double T gib, mobile vertically, extending along a direction perpendicular to the running direction, and with a T-shaped external section, extending cantilever with respect to the jaw, to engage into a matching groove of the corresponding grip and a reverted T-shaped internal section placed in a transversal recess arranged in the said jaw and capable of been supplied with fluid on each side of the said T-shaped internal section which constitutes a double action cylinder piston, respectively, for clamping the grip onto the jaw and for moving the grip away.

When the upper jaw is mobile vertically whereas the lower jaw is fixed, the upper T-shaped section of each mobile gib can be provided, on its upper face, with at least two track rollers bearing on the bottom of the groove in order to support the said grip whereas the gibs may slide into upward position.

In such a case, the upper jaw can be fitted, advantageously, with a bayonet fastening means for the upper grip comprising at least two clamping jacks, each with a stem mounted to pivot around a vertical axis, whereas each stem is fitted, at its extremity, with two aligned sections forming hooks, capable to engage into a cavity arranged in the grip by passing through an oblong hole of corresponding shape and to force against the bottom of the said cavity, on both sides of the oblong hole, after rotation of the stem, in order to clamp the grip onto the jaw.

Besides, one of both clamping devices can be associated with at least one adjustable block, interposed between the lower jaw and the lower grip in order to align the mean planes of both bands.

Using, according to the invention, a tool-carriage forming a feeder also enables, for easy maintenance, to fit the machine with a replacement tooling comprising at least one sliding hooking device mounted on a transversal guiding path arranged on the tool-carriage and capable to engage in a removable way, at least on the lower grip of each clamping device in order to extract from the frame at least the lower grip and to bring it onto the tool-carriage by sliding on the guiding path and, conversely, to put a replacement grip back into the frame. Preferably, the upper grip can be disassembled from the jaw and rests on the lower grip for simultaneous disassembly and reassembly of both grips.

Generally, the welding tooling will consist of both clamping devices, respectively of both bands, the former being connected to two holes of a source of electric current to perform flash butt-welding.

To this end, each clamping device comprises an electrically insulating layer, interposed between each clamping grip and the corresponding supporting jaw, and the grips of both supporting devices are connected respectively to two poles of a source of electric current via electrically insulated circuits in order to perform the welding operation by passing the current exclusively through the said grips and both bands.

But the use of a longitudinally movable tool-carriage also enables, if needed, to perform the welding operation with special equipment, such as a continuous welding torch, for instance a laser, plasma or arc-welding torch. Indeed, such a torch can be mounted on a supporting chassis movable on a transversal guiding path of the tool-carriage for butt-welding of the edges, respectively downstream and upstream, of both bands, after shearing and clamping the latter.

According to another very advantageous feature of the invention, position adjustments at least longitudinally of all the toolings are performed from the fixed frame, which serves as a common reference for all the operations.

Especially, after clamping the downstream extremity of the first band, the first clamping device may remain in clamped position until completion of the connection operations, whereas the fixed frame serves as a position reference for all the toolings and all the operations.

However, according to another embodiment, the first clamping device mounted on the fixed frame is unclamped on completion of the welding, whereas the second clamping device remains in clamped position to enable centring of the welded edges on the flattening tooling, by a retraction of the mobile frame. The clamping device of the fixed frame is then clamped again and the clamping device of the mobile frame is unclamped and retracted to allow passage of the flattening tooling, then clamped again on the band.

Besides, the supporting chassis of the flattening tooling can advantageously be provided with at least one horizontal guiding part capable to engage, by transversal displacement of the chassis, on a matching profile section arranged at least on the mobile jaw of the supporting device of the fixed frame and forming a horizontal guiding rail for automatic adjustment of the flattening tooling according to the thickness of the welded band.

BRIEF DESCRIPTION OF THE DRAWINGS

The invention will be better understood by the following description of a particular embodiment, given for exemplification purposes, and represented on the appended drawings.

DETAILED DESCRIPTION OF THE PREFERRED EMBODIMENT

Figure 1:
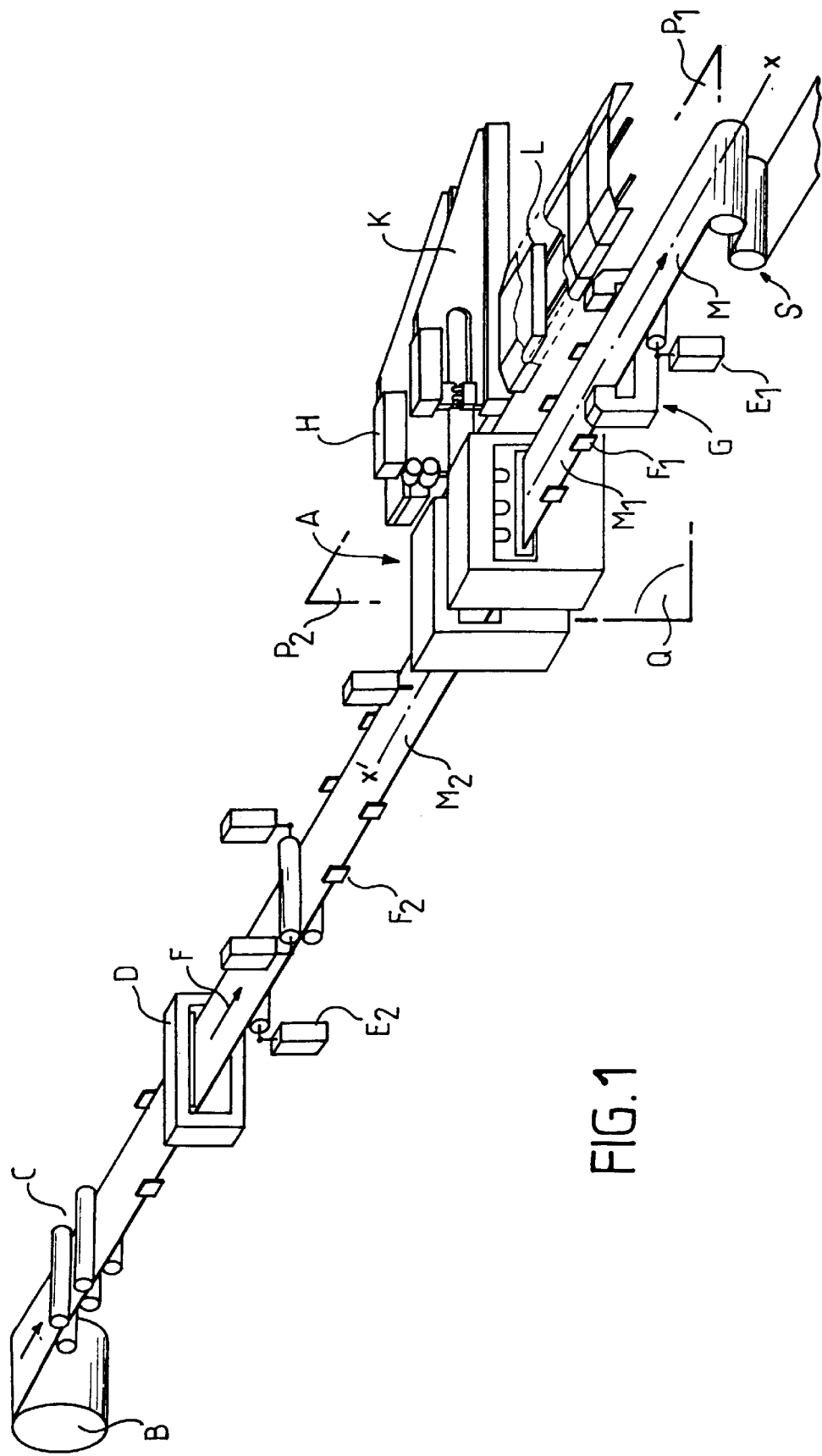
FIG. 1 is a perspective diagrammatical view of a complete line for connection of bands provided with a machine according to the invention.

FIG. 1 is a perspective diagrammatical representation of a complete installation for connecting a metallic band M unwinding from a reel B according to a longitudinal running direction x'x, by passing through a welding machine A at the downstream extremity, in the running direction, of a first band M1 with the upstream extremity of the following band M2.

The installation comprises the devices used normally such as a hammering machine C located immediately downstream of the reel B in order to straighten the band, guillotine shears D, two looping devices E1 and E2 located respectively downstream and upstream of the welding machine A to allow limited longitudinal and transversal displacements of both bands M1 and M2 and two centring devices F1, F2 located respectively on the path of the first band M1 and of the second band M2, for centring the latter. Finally, a notching machine G is located downstream of the welding machine in order to eliminate the extremities of the welding bead at the lateral edges of both bands. An S-shaped assembly consisting of offset cylinders, so-called 'S-shaped' block, enables to move forward and to pull the running band.

Besides, the machine comprises a shearing tooling H and a planing machine K which, according to the invention, are placed on a tool-carriage L movable parallel to the running axis of the band.

Figure 4:
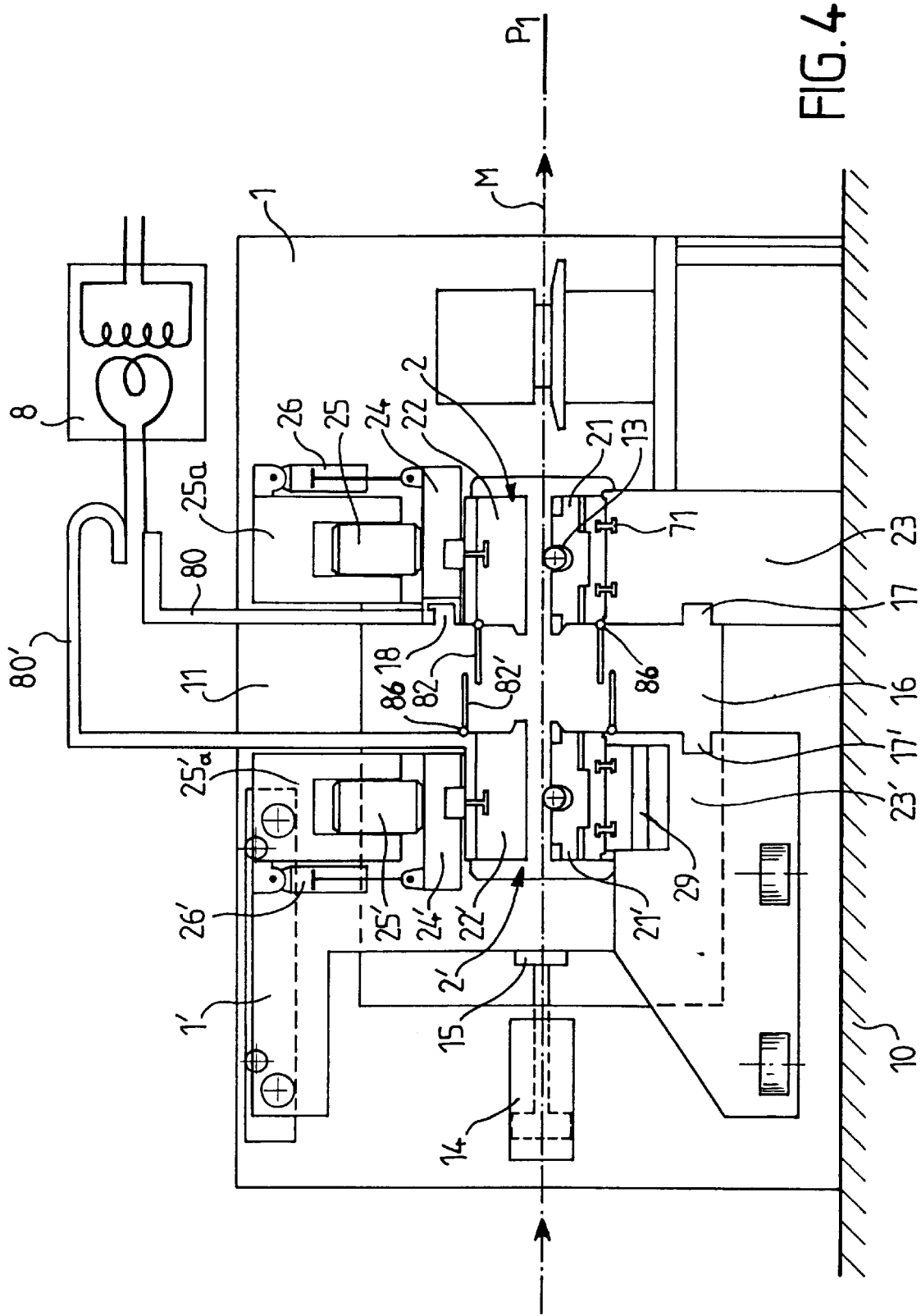
FIG. 4 is an elevation diagrammatical view of the welding machine, along the AA-line of FIG. 2.

FIG. 4 is an elevation diagrammatical representation of the welding machine comprising a fixed frame 1 and a mobile frame 1' on which are mounted, respectively, two pairs of clamping grips 2, 2'.

Figure 2:
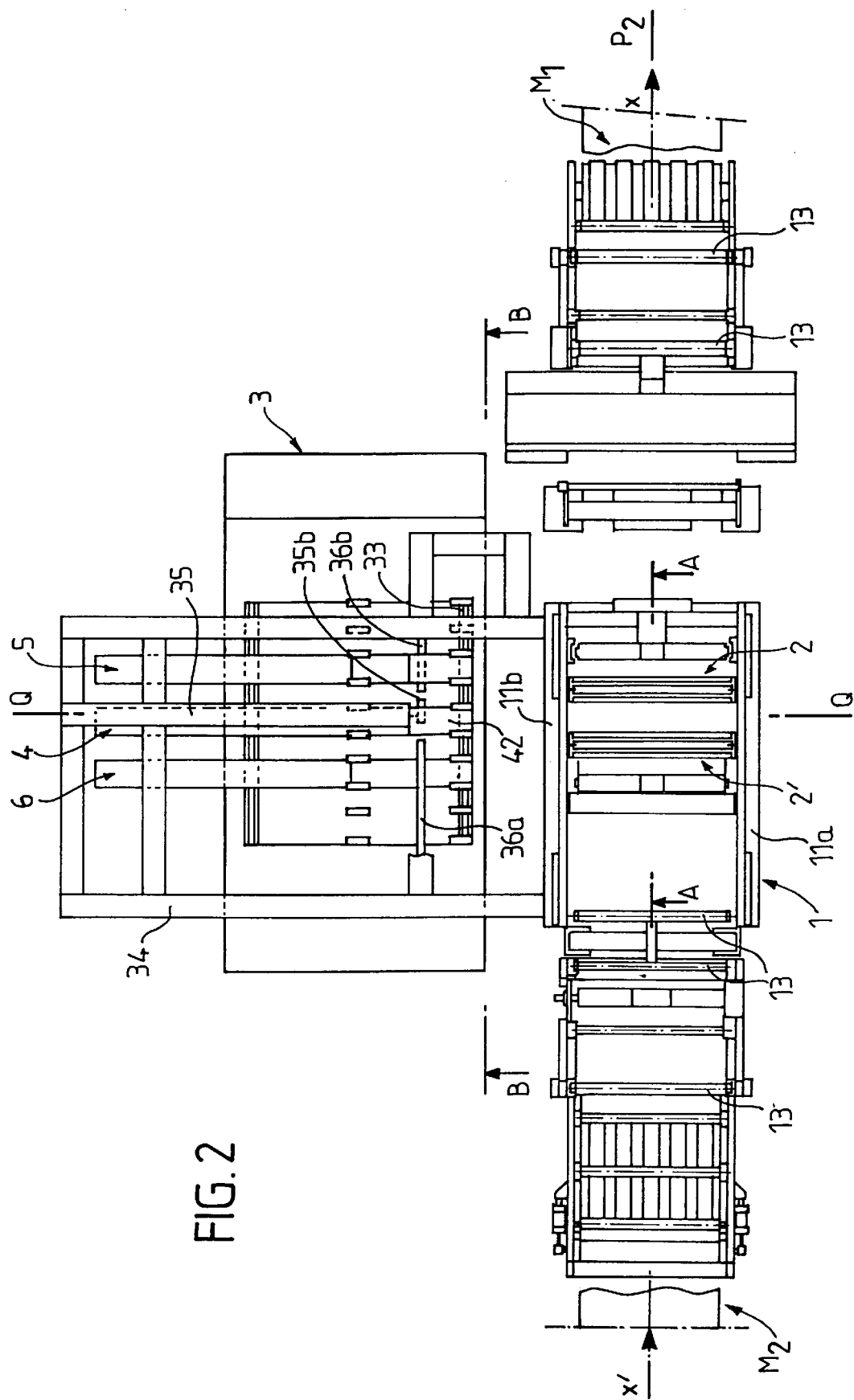
FIG. 2 is an elevation diagrammatical view of the machine.
Figure 3:
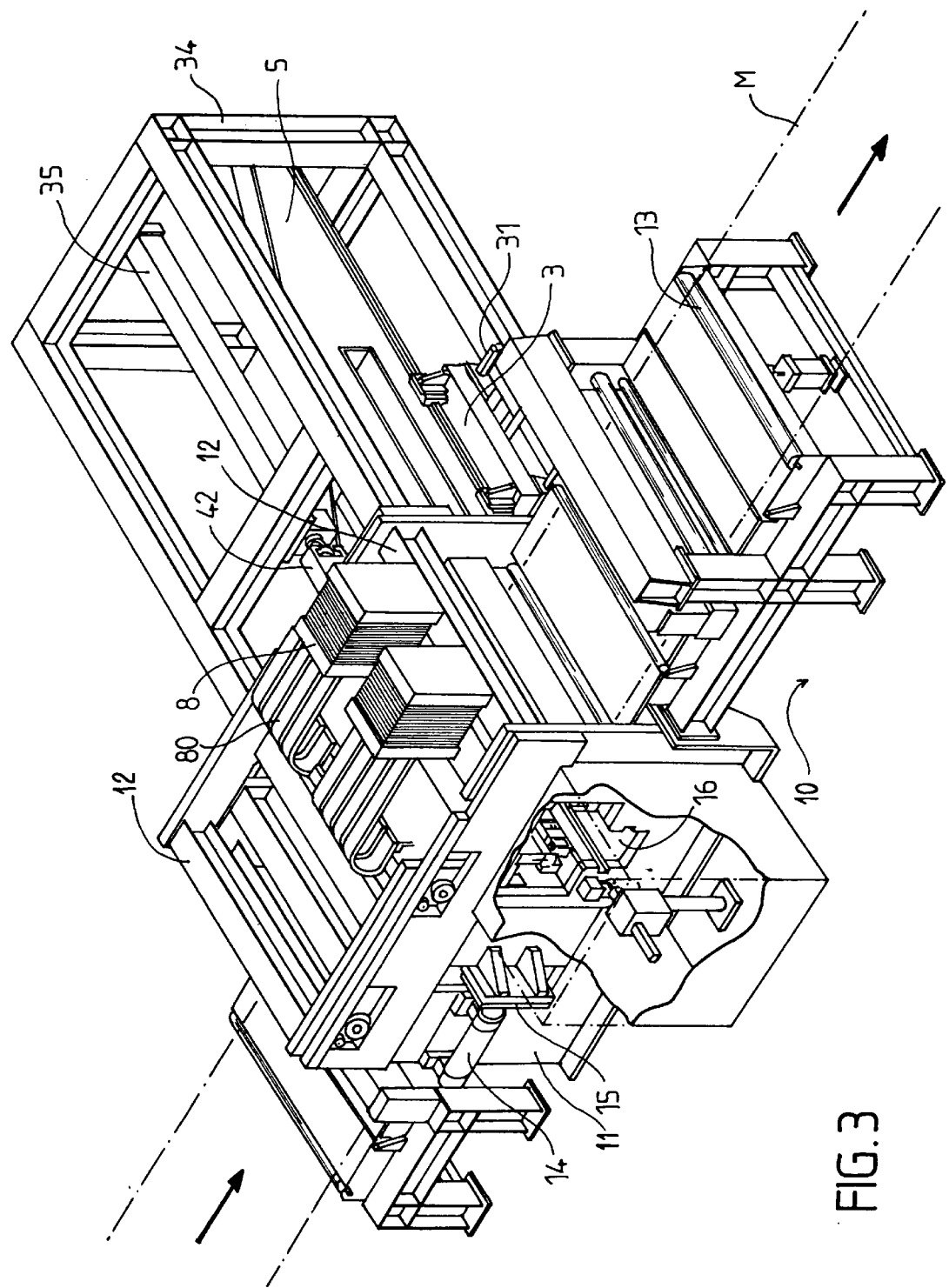
FIG. 3 is a perspective diagrammatical view of the machine.

FIG. 3 is a perspective representation of the fixed frame 1 consisting mainly of two rectangular posts 11a, 11b as shown in FIG. 2 spaced from one another and linked by crosspieces 12 in order to built a rigid cage fixed on the foundation block 10.

The band M passes between both posts 11a, 1b according to a mean running plane P1 substantially horizontal, delineated by a set of cylinders 13.

The band M is centred on a longitudinal running axis x'x located substantially on the longitudinal plane of symmetry P2 of the frame 1.

The mobile frame 1' also comprises of a cage mounted to slide, parallel to the axis x'x, between both posts 11a, 11b of the fixed frame 1. Displacement of the mobile frame 1' is controlled by two jacks 14 the body of which is fixed on the corresponding post 11 of the fixed frame 1 and the stem of which rests on a bearing plate 15 connected to the mobile frame 11' and extending outward through a window 16 of each post 11a, 11b, as indicated in FIG. 4, the fixed frame 1 and the mobile frame 1' each carry a device, respectively 2 and 2', for maintaining the band and consisting of a pair of clamping grips.

The first clamping device 2, mounted on the fixed frame 1, comprises a lower grip 21 and an upper grip 22 fixed, respectively on a lower jaw 23 and an upperjaw 24.

The lower jaw 23 forms a fixed base connected to both posts 11a, 11b of the fixed frame 1 and bearing on the foundation block 10.

The upper jaw 24 is mounted to slide vertically between both posts 11a and 11b and can be actuated by at least one jack 25 the body of which is arranged on a crosspiece 25a bearing on both posts 11a, 11b of the fixed frame 1. Preferably, the crosspiece 25a should accommodate several jacks 25 distributed over the width of the machine and which can be supplied selectively.

Advantageously, very powerful single action jacks 25 are used for clamping both grips and double action jacks 26 control the vacuum displacement of the upper jaw 24.

The second clamping device 2' is quite similar and therefore comprises a lower grip 21' and an upper grip 22'. The lower grip 21' is mounted on a lower jaw 23' arranged on a crosspiece of the mobile frame 1' and the upper grip 22' is fixed on an upper jaw 24' which can be clamped by jacks 25' and is moved vertically by double action jacks 26'.

Thus, the metallic band M moving inside both frames 1, 1' along the running plane P1 passes between both clamping devices 2, 2' which are represented in open position on FIG. 4. Using the clamping jacks 25 and 25', it is possible to block, respectively the downstream extremity or "trailing edge" of the first band M1 between the grips 21, 22 and the upstream extremity or "leading edge" of the following band M2 between the grips 21', 22' of the second clamping device 2', while actuating the appropriate number of jacks 25, 25' according to the width of the band.

Besides, as shown diagrammatically on FIG. 4, both clamping devices 2, 2' are connected, respectively, by conductors 80, 80', to both poles of a source of electric current 8, in order to perform the welding operation after clamping the extremities of both bands between both pairs of grips which thus serve as electrodes.

On one side of the fixed frame 1, moreover, a tool-carriage 3 has been arranged to slide on two rails 31 fixed on the foundation block 10 and parallel to the running axis x'x.

Figure 6:
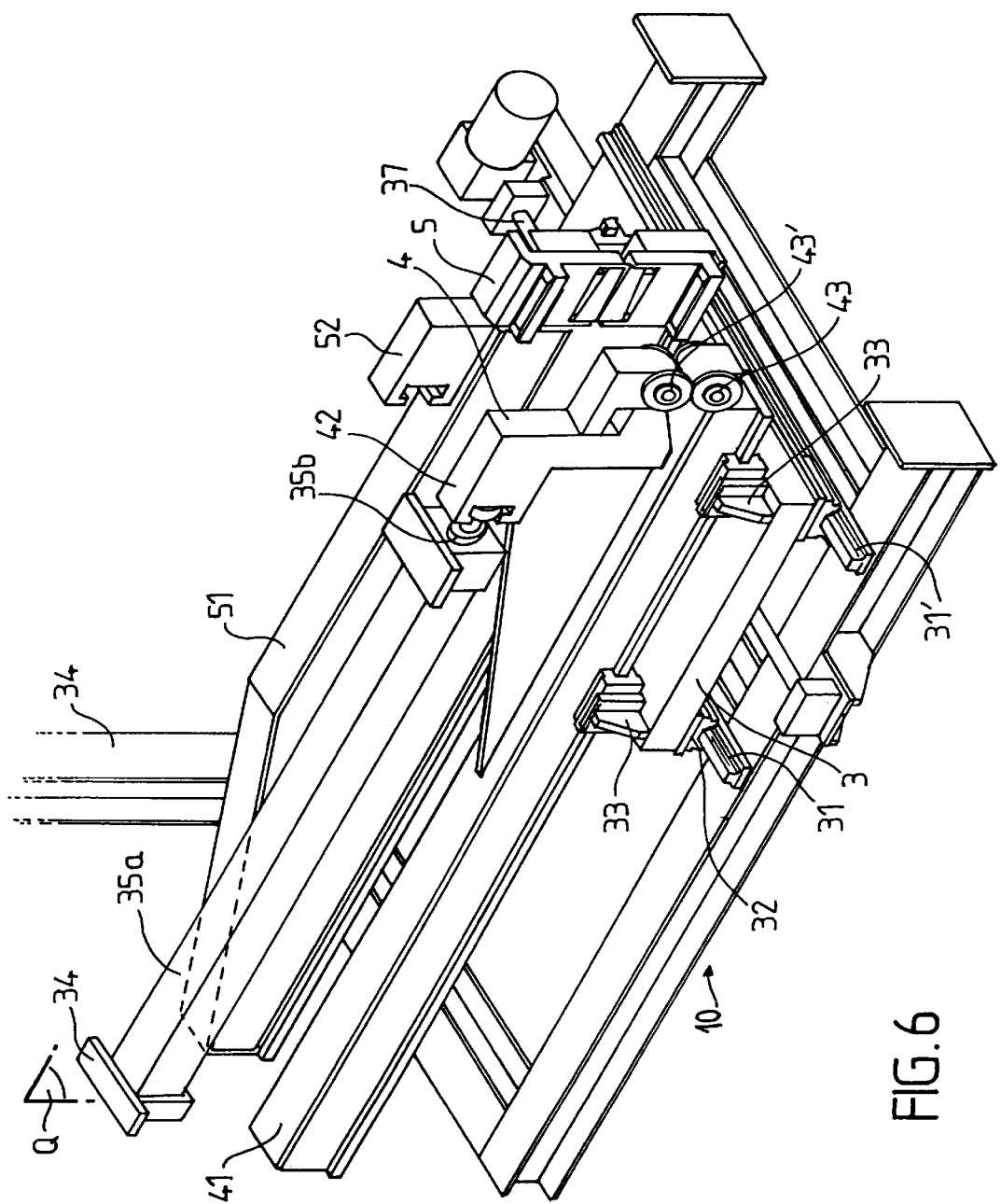
FIG. 6 is a perspective view of the tool-carriage.

The tool-carriage which is represented in perspective on FIG. 6, comprises of a platform 3 supported by pads 32 mounted to slide on two parallel rails 31, 31' and on which are arranged several guiding paths 33 along a transversal direction, perpendicular to the running axis x'x and, consequently to the rails 31, 31'.

On such machines, all the driving devices as well as the ancillary devices are placed on the same side of the band, so-called "driving side" in order to free the other side, so-called "operator's side". The tool-carriage 3 will, therefore, normally be located on the driving side.

Figure 5:
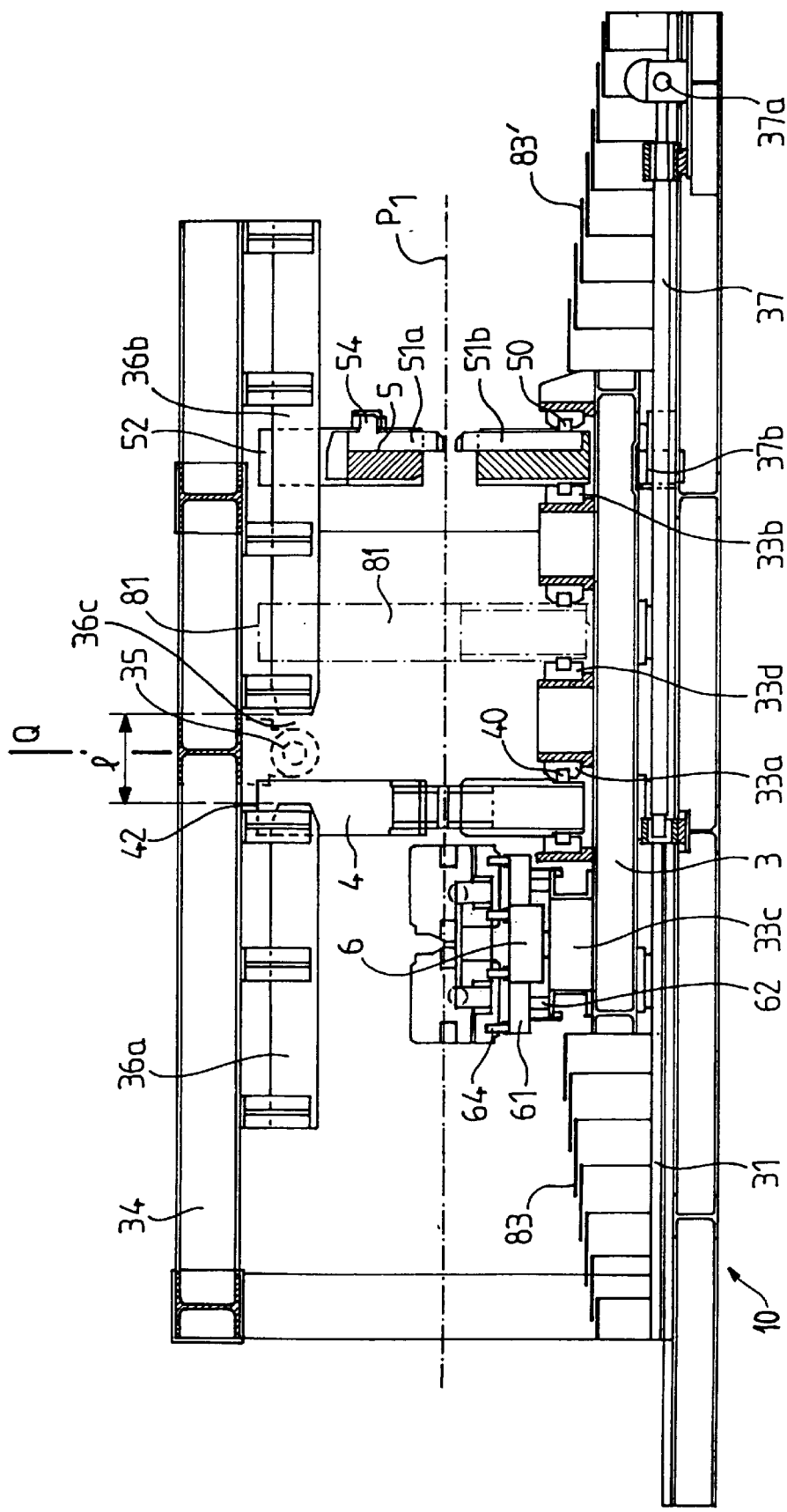
FIG. 5 is an elevation view of the tool-carriage, along the BB-line of FIG. 2.

As indicated on FIG. 5, which is a sectional view along a plane B, B (FIG. 2), parallel to the running direction x'x, the tool-carriage 3 is provided, on the example represented, with several transversal guiding paths, respectively a first path 33a for a shearing tooling 4, a second path 33b for a planing tooling 5 and a third path 33c for a changing tooling 6 for maintenance or replacement of the grips.

Possibly, a fourth path 33d can be arranged for a running welding tooling 81, for instance a laser torch usable for metals incompatible with flash welding.

It should be noted that such an installation provided previously with two welding means, respectively flash welding using grips and laser or plasma welding using a torch movable transversally, enables to adapt immediately the welding mode to the metal nature and, consequently continuous process of the different butt-welded metallic bands.

Each transversal guiding path may advantageously comprise of four pads in the form of jaws on which slide rectilinear guiding rails fixed to the base of each tooling supporting chassis. Thus, on the FIG. 6 which is a perspective partial view of the tool-carriage, one can see that the cutting tooling 4 is mounted on chassis 41 extending along a direction transversal to the running axis x'x and fitted at its base with two rectilinear rails 40 which slide in the pads 33 forming the transversal guiding path.

Figure 9A:
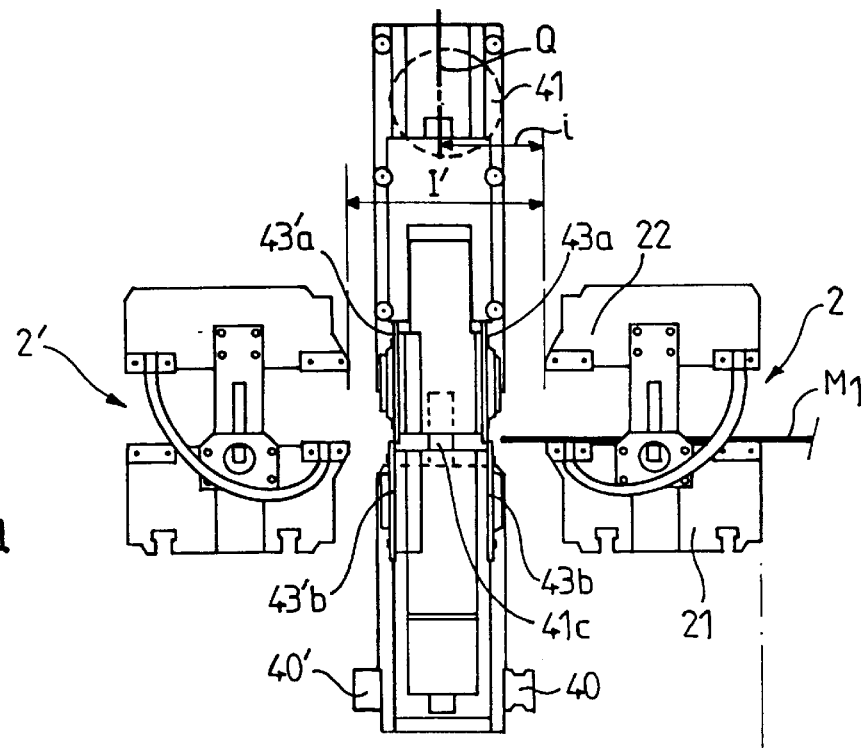
FIGS. 9a and 9i are diagrammatical representations of the various connection operations.

Preferably, as indicated on FIG. 9a, one of the rails 40, for instance that on the right on the figure exhibits a dovetail profile to ensure lateral guiding and the other rail exhibits a rectangular section to ensure vertical guiding, whereas the pads have matching profiles.

As indicated above, it is necessary to eliminate the beads caused by the welding process and to this end it is used a flattening tooling 5 mounted on a chassis 51 guided on the corresponding guiding path 33b which may consist, in the same way, of four pads in which slide two rectilinear rails 50 fixed at the base of the chassis 51 supporting the tooling 5. In the example represented, this tooling is a planing machine.

Besides, the carriage 3 is associated with means for common displacement of the toolings, consisting of a jack 35 bearing, on the side opposite the fixed frame 1, on a fixed structure 34 and centred on a vertical plane Q perpendicular to the running axis x'x and delineating a mean working position.

The fixed structure 34 advantageously constitutes a gantry crane spanning the carriage assembly 3 and the various toolings supported by the latter.

The control jack 35 comprises a body 35*a* fixed on the structure 34 and a stem the extremity 35*b* of which is enlarged in order to form a head for hooking one of the tooling supporting chassis 41, 51 (FIG. 6).

To this end, each chassis 41, 51 is provided, at its upper section, with a guiding section 42, 52 whose profile matches that of the hooking head 35*b*, in order to engage on the latter by longitudinal sliding of the carriage 3.

Preferably, as shown on FIG. 5, the structure 34 is provided with an upper rail 36 consisting of two sections, respectively 36*a*, 36*b*, extending along the longitudinal direction, respectively on both sides of the control jack 35 and with a profile identical to that of the hooking head 35*b*. Between both sections 36*a*, 36*b* of the guiding rail is placed a free space the width (l) of which is greater than that of the tooling supporting chassis 41, 51.

Each chassis 41, 51 is therefore maintained at its base by the corresponding transversal guiding path 33*a*, 33*b* and, at its upper section, by the guiding section 42, 52 sliding along the corresponding section 36*a*, 36*b* of the guiding rail and engaging on the hooking head 35*b* of the control jack 35 when the corresponding tooling supporting chassis 41, 51 is placed, by longitudinal displacement of the tool-carriage 3, in a working position substantially centred on the plane Q.

In this working position, the double action control jack 35 controls the displacement of the tooling supporting chassis 41, 51 in one direction or the other, on the corresponding transversal guiding path 33*a*, 33*b*, to actuate the tooling inside the frame 1, by passing through the window 16 arranged on the post 11*b* of the frame 1 located beside the tool-carriage.

Thus one can see that a first advantage of the invention lies in the fact that all the toolings necessary to the connection operation are gathered on the same tool-carriage, particularly compact, which forms a feeder capable to move parallel to the guiding axis in order to place one of the toolings in a common working position, according to the order of operations.

Longitudinal displacement of the tool-carriage 3 on its rails 31 is controlled, on the example represented, by a worm 37 centred on an axis parallel to the running axis x'x, brought into rotation by a motor 37*a* and engaging into a nut 37*b* connected to the platform of the tool-carriage 3. The nut 37*b* is, preferably, a ball bearing nut for accurate positioning of the carriage 3 with respect to the fixed frame 1.

According to another essential feature, the cutting tooling 4 may shear simultaneously both extremities, respectively downstream and upstream of both bands M1 and M2 along both shearing planes Q1, Q2, spaced by a constant distance d. In each plane, shearing is made by two opposite blades, respectively upper 43*a* and lower 43*b* joining tangentially at the level of the sheet to be cut and placed on both sides of the shearing plane Q1 (Q2).

The supporting chassis 41 therefore comprises two arms, respectively upper 41*a* and lower 41*b* extending on both sides of the running plane P and on which are mounted two pairs of blades, respectively upper 43*a*, 43'*a* and lower 43*b*, 43*b'*.

Preferably, a wall 41*c*, extending along a middle plane passing between both blades and forming a cradle giving rigidity to the assembly, links both arms 41*a*, 41*b*.

The sheet can be shorn off by transversal displacement of the chassis 41 by the jack 35, either by a pushing or by a pulling action. However, for correct shearing, the axes of the blades, respectively upper 43*a* and lower 43*b*, should preferably be offset in the shearing direction, by a "so-called offset" distance (e).

Figure 8B:
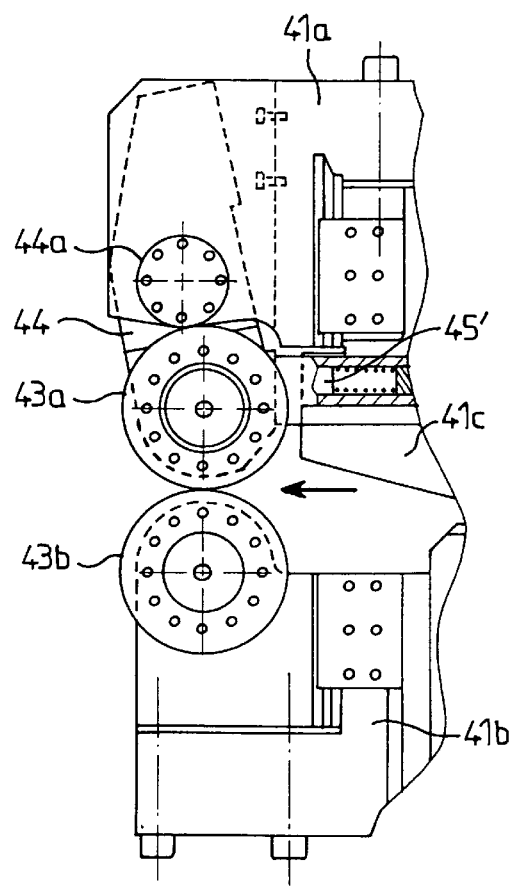
FIGS. 8a and 8b are detailed views of the cutting tooling showing, respectively, both positions of the shearing blades.
Figure 8A:
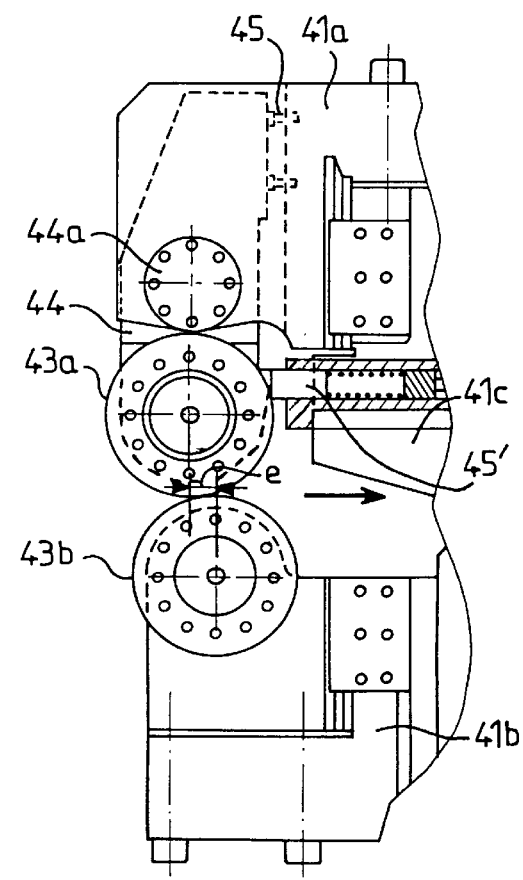

Indeed, as shown on FIGS. 8*a*, 8*b*, both upper blades 43*a*, 43'*a* are carried by a vertical post 44 which is mounted to pivot around a horizontal axis on the corresponding extremity of the upper arm 41*a* and which is pushed back, at its lower section, by an elastic stop 45' actuated by a spring, in order to force against a fixed stop 45 arranged in the extremity of the arm 41*a* and whose position can be adjusted by screws. In this position, represented on FIG. 8*a*, the horizontal axis of rotation of both upper blades 43*a*, 43'*a* is offset, with respect to the axis of rotation of the lower blades 43*b*, 43'*b*, by a distance e which can be adjusted by moving the stop 45.

Figure 9B:
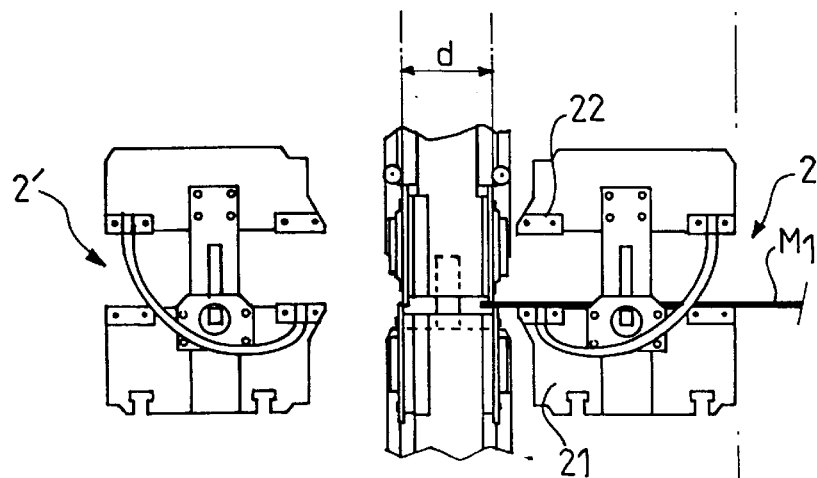
Figure 9C:
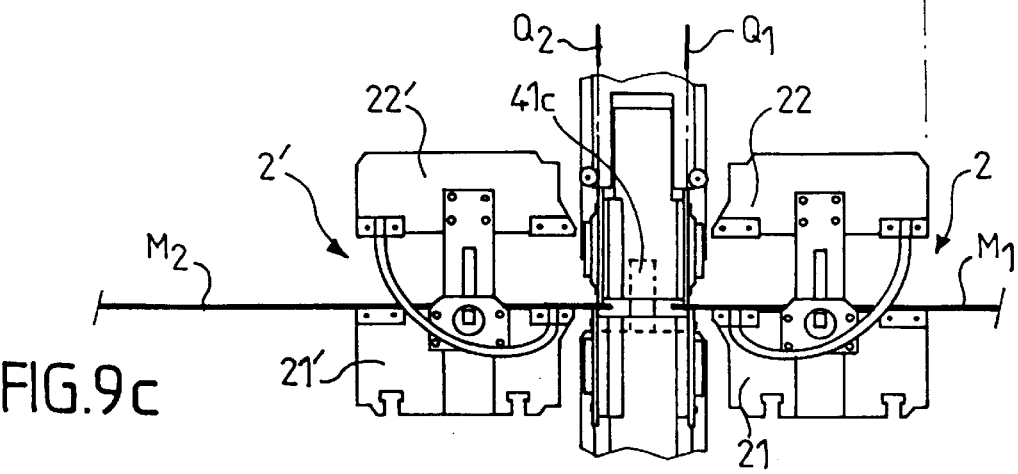
Figure 9G:
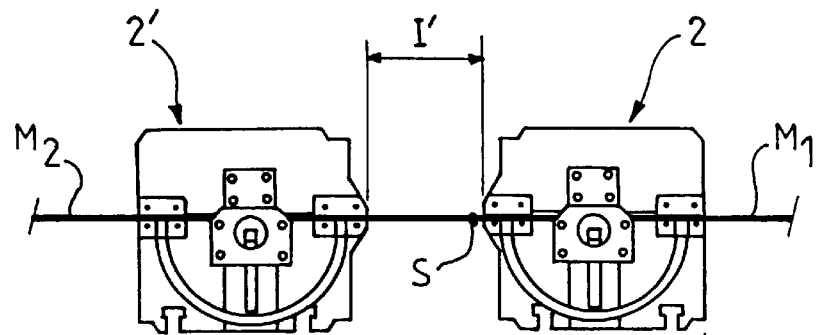
Figure 9H:
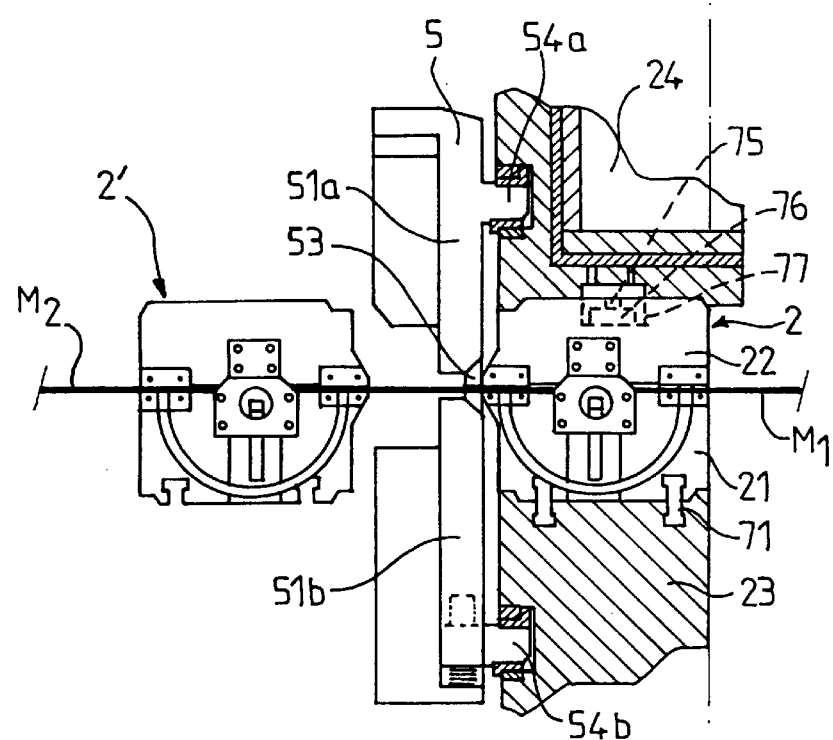
Figure 9I:
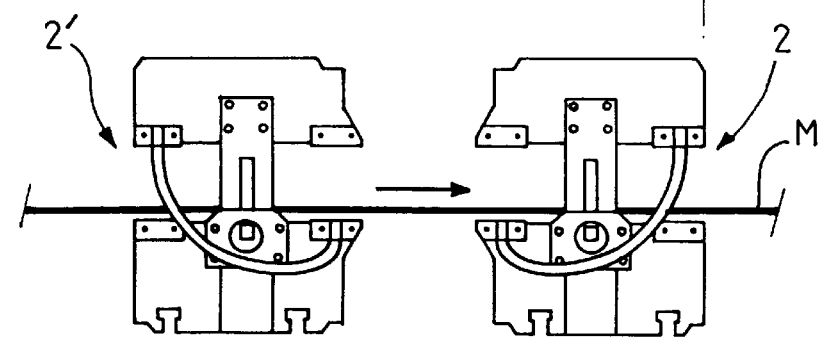

The various shearing operations are represented diagrammatically, seen from the front, on FIGS. 9*a*, 9*i*.

FIG. 9*a* shows the position of the shears after passage of the first band M1 whereas the rear section of which forming the tail, rests on the lower grip 21 of the first clamping device 2, whereby the position of the band can be roughly adjusted by the S-shaped block.

At this stage, the mobile frame 1' is retracted with respect to the fixed frame 1 in order to produce between the plates of both clamping devices, respectively fixed 2 and mobile 2', a free interval (I) wide enough to allow passage of the chassis 4 and of the blades 43 behind the tail of the first band M1.

On the figures, it has been represented the mean working plane Q on which is centred the control jack 35 shown as a dotted line, and which is placed at a distance (i) of the rear extremity of the grips 21, 22 of the fixed clamping device 2.

Figure 7:
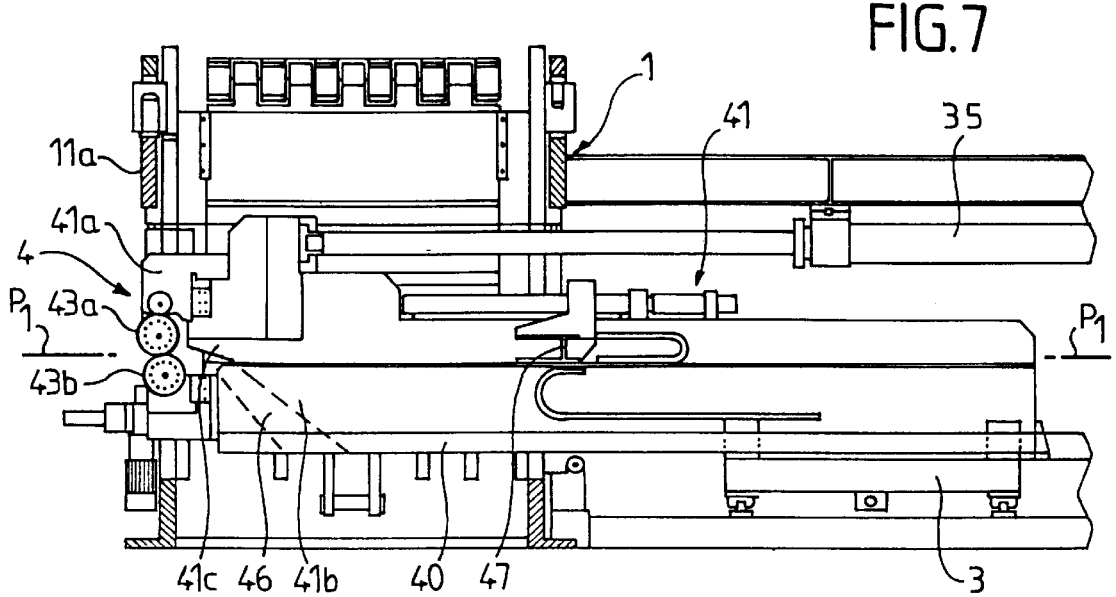
FIG. 7 is an elevation view of the cutting tooling.

Both pairs of shearing blades 43, 43', which delineates two shearing planes, respectively front Q1 and rear Q2, spaced by a constant distance (d), are thus placed on the other side of the band M1, e.g. on the operator's side of the machine, in the position represented on FIG. 7.

The carriage 3 can then be brought closer to the fixed clamping plate 2, in the position indicated on FIG. 9*b*. If needed, the middle wall 41*c* may stop against the tail of the band M1.

The jacks 14 move the mobile frame 1' forward with the mobile clamping device 2' to the position indicated on FIG. 9*c* for which the front extremity of the mobile grips 21', 22' is close to the chassis 4.

Then the head of the second band M2 is inserted between both grips 21', 22', in a position which can be adjusted by a pinching device associated with the looping device E2 so that its extremity is located ahead of the rear shearing plane Q2, whereby the forward motion of the band M2 is limited by the cradle 41*c* extending between both branches of the chassis 41, in the middle plane of the latter (FIG. 9*c*).

Moreover, both centring devices F1, F2 located respectively downstream and upstream of the welding machine A, ensure alignment of both bands M1, M2 substantially on the same axis x'x, taken into account the possible cutting default.

Both pairs of grips of both clamping devices 2, 2' are then forced against both bands M1, M2 which can thus be brought closer to one another, whereas their extremities can partially engage between the axes of the blades, respectively upper and lower.

The carriage 3 can therefore be moved toward the fixed plate 2, in the position indicated on FIG. 9d, whereas the tool-carriage 4 is pulled onto the carriage 3 by the jack 35.

In order to correct the alignment defect, the chassis 41 of the shearing tooling carries a measuring system, for instance consisting of photocells capable to move transversally in order to reach of the edges of both bands M1, M2 located on both sides of the cradle 41c, to measure and to compare the relative positions of the edges of both bands. The upstream centring device F1 is fitted with means for clamping the tail of the first band M1 and for moving the latter transversally after clamping. Such means, for instance a pinching device and a worm-operated displacement system have not been represented on FIG. 1.

After tightening the mobile grips 21', 22' on the head of the band M2 and clamping the tail of the band M1, the relative positions of the edges are compared and, according to the results of the comparison, the upstream band M1 is slightly moved transversally, for accurate centring of the axis of the tail of the band M1 on the axis of the head of the band M2 maintained in the clamping device 2'. The looping device, provides, indeed, a certain freedom of transversal displacement to the band.

Once both bands have been perfectly aligned, the fixed grips 21, 22 tighten the tail of the first band M1 which, from now on, is connected rigidly to the fixed frame 1 which, according to one of the features of the invention, will serve as a reference for all the following operations.

The carriage 3 can then be moved forward toward the fixed plate 2, in the position indicated on FIG. 9d, in order to adjust a set cantilever distance p1 between the first shearing plane Q1 and the rear extremity of both grips 21, 22 of the fixed clamping device 2, as shown on FIG. 9d' which is a detailed view of FIG. 9d. It should be noted that the use, for displacing the carriage 3, of a worm 37 associated with a ball bearing nut enables to adjust with great accuracy the position of the carriage and, consequently, of the blades, and thus to adapt exactly the cantilever distance to the nature of the metal at hand and to the thickness of the band before proceeding to the forging operation.

In a similar way, both grips 21', 22' of the mobile plates 2' forcing against the second band M2 are moved forward by the jacks 14 serving to displace the mobile frame in order to adjust accurately a set cantilever distance p2 between the second shearing planes Q2 and the front extremity of both grips 21', 22'.

It will be noted that the sliding assembly of the hooking section 42 with respect to the head 35b of the jack centred on the mean working plane Q confers the shearing tooling 4 a certain freedom of displacement for accurate cantilever adjustment.

Also, the lower jaws 23, 23' are each fitted with a scalloping 17, 17' for the passage of the guiding rails 40, of the chassis 41, with a lateral clearance sufficient to enable cantilever adjustment by moving the chassis 41 and the mobile frame 1'.

As both pairs of blades are in the position shown on FIG. 9d, the extremities of both bands are shorn off by bringing the tool-carriage 4 on the carriage 3, using the jack 35, whereas the shearing operation is performed by a pulling effect.

As indicated on FIG. 8a, the upper blades 43a, 43b are offset by a distance e backwards with respect to the lower blades 43b, 43b', in order to perform the shearing operation in good conditions.

Thus, it is obtained, on the tail of the first band M1 and the head of the second band M2, two shorn off edges m1 and m2 spaced by the constant distance d and, consequently, perfectly parallel.

After retraction of the shearing chassis 4 on the carriage 3, the mobile chassis 1' is brought toward the fixed chassis 1 in order to put in contact the extremities of both bands M1, M2 and it is possible to proceed to the welding operation by applying a voltage to both pairs of grips serving as electrodes and which are linked to a source of electric current as indicated diagrammatically on FIG. 4.

There is first of all a heating process, then the jacks 14 used to displace the mobile frame determine the forging pulse between the extremities in contact with both sheets.

As indicated diagrammatically on FIG. 4, both clamping devices, fixed 2 and mobile 2', are advantageously provided with two pairs of mobile flaps 82, 82' mounted to pivot, respectively, on the four grips 21, 22, 21', 22' and associated with means 86 to control the tipping of the said flaps between a raised position and a retracted position. Such means, easy to be designed, have not been represented in detail on the figure. The opposite flaps 82, 82' are slightly offset vertically and overlap each other partially.

The flaps are raised in order to enable position adjustments of the mobile frame. After tightening the grips, the flaps are retracted in order to delineate, on both sides of the zone to be welded, a relatively confined space in which a neutral or reducing gas is injected which enables to limit oxidation.

Upon completion of the welding operation, the flaps 82 are raised and the mobile grips 21', 22' open, as indicated on FIG. 9f.

Conversely, in the represented embodiment, the fixed grips 21, 22 remain clamped on the tail of the sheet M1 until completion of all the operations. Thus, the single band consisted of both bands M1, M2 link by the weld S also remains fixed.

As the mobile grips 21', 22' are open, the mobile frame 1' is moved backwards in order to leave between both clamping devices, fixed 2 and mobile 2', an interval I', then the mobile grips 21', 22' clamp the band again, as shown on FIG. 9g.

The interval I' is substantially constant and corresponds to the width necessary to the passage of the planing device 5, as represented on FIG. 9h. For instance, a width of 200 to 250 mm may prove sufficient.

Upon completion of the planing operation, both clamping devices, respectively fixed 2 and mobile 2', are open in the positions indicated on FIG. 9i, and the single band M consisting of both welded bands M1 and M2 and can then be driven to the following sections of the processing installation.

The planing device 5 is mounted on a chassis 51 and comprises usually, two sets of cutting pellets 53 spaced by a distance which must be adjusted in relation to the thicknesses of both sheets in order to eliminate completely the beads formed during welding on both faces of the former.

Figure 11:
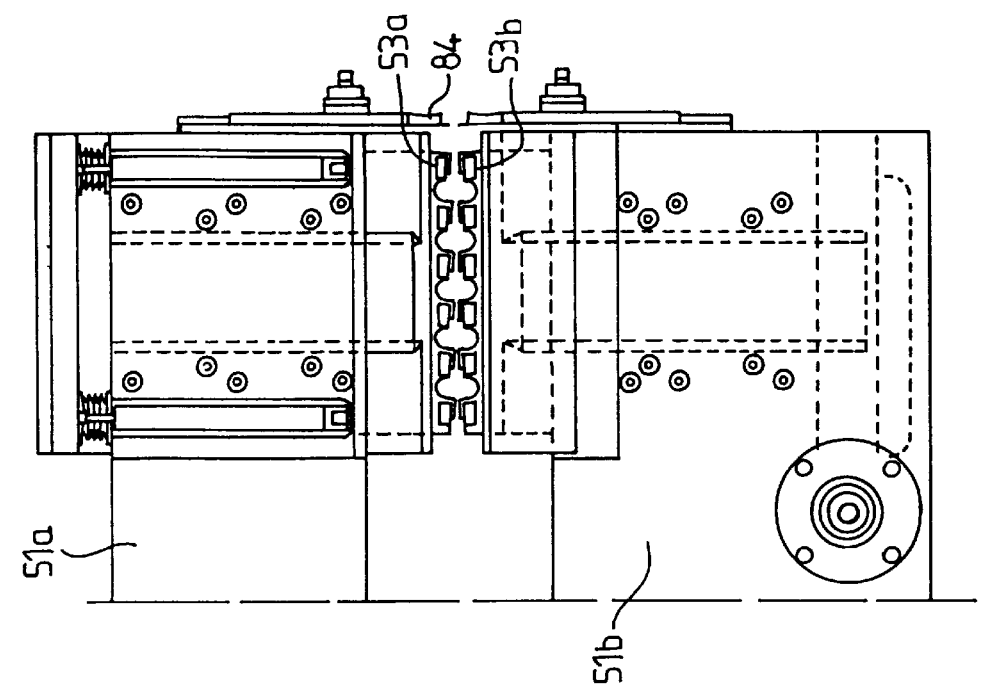
FIG. 11 is a detailed view, in enlarged scale, of the planing tool.
Figure 10:
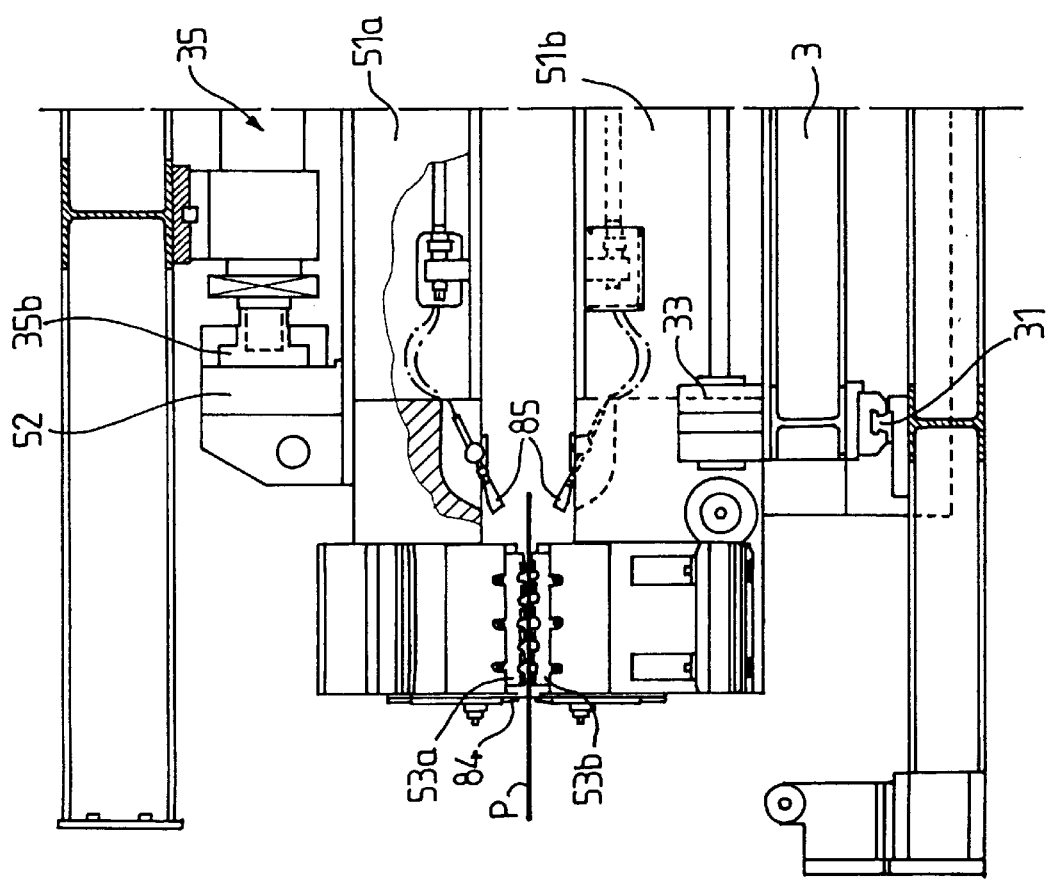
FIG. 10 is a partial elevation view of the planing device.
Figure 12:
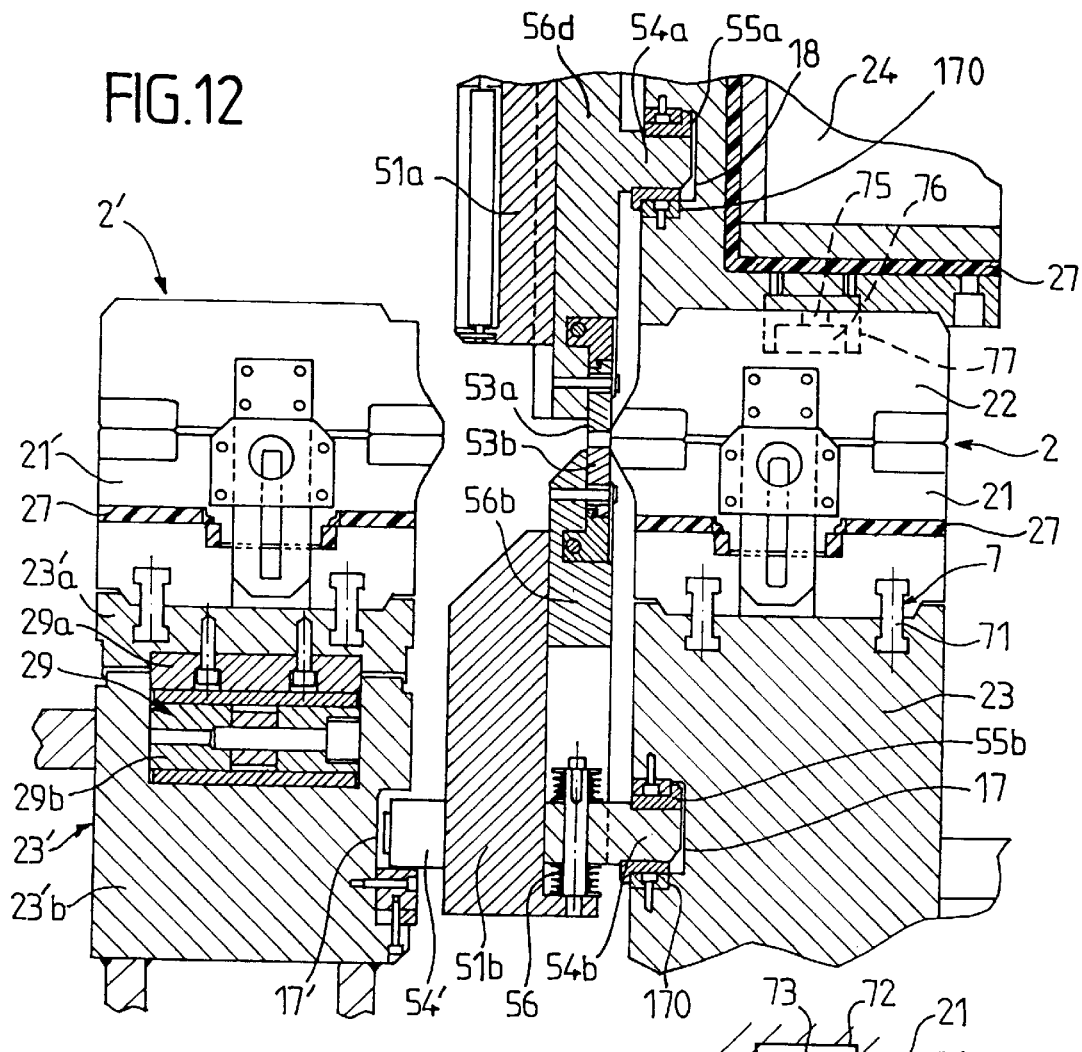
FIG. 12 is a cross sectional view of the planing tool passing between both pairs of grips.

As shown on FIGS. 10 to 12, the chassis 51 supporting the planing tooling comprises two arms, respectively upper 51a and lower 51*b*, extending respectively above and beneath the mean running plane P1 of the bands and carrying, at their extremities, two planing pellet assemblies, respectively upper 53*a* and lower 53*b*, in order to plane both faces of the welded spot.

Preferably, each pellet assembly 53*a*, 53*b* is carried by a supporting chassis 56*a*, 56*b* mounted on the corresponding arm 51*a*, 51*b* with the possibility of vertical clearance enabling the various adjustments. To this end, according to a particularly advantageous embodiment represented on FIG. 12, each supporting frame 56*a*, 56*b* of a planing assembly 53*a*, 53*b*, is provided with a guiding part 54*a*, 54*b* extending and protruding toward the fixed frame.

The guiding part 54*a* of the upper supporting frame 56*a* engages into a scalloping 18 of the upper fixed jaw 21 as the chassis 51 is moved forward by resting, via a slide 55*a*, on a friction gasket 170 arranged along the scalloping 18. This way, the scalloping 18 forms a horizontal guiding groove for the planing assembly 53*a*.

Similarly, the lower supporting frame 56*b* is provided with a guiding part 54*b* arranged in the alignment of the guiding rail 50 of the chassis 51 and can engage, as the chassis moved forward, into a scalloping 17 arranged on the fixed lower jaw 53 and provided with a friction gasket 170 on which the guiding part 54*b* may slide.

Thus, both supporting frames 56*a*, 56*b*, respectively, of the upper 53*a* and lower 53*b* planing assemblies are guided horizontally on two sliding grooves the level of which is fixed by both jaws of the fixed clamping device 2. The distance between the planing pellets can therefore be adjusted automatically according to the thickness of the welded band corresponding to the distance between both jaws.

Besides, the welded band rests, normally, on a constant level running plane and, it might consequently be sufficient to guide only the upper planing tool 53*a* in order to adjust the distance. Preferably, however, the lower supporting frame 56*b* should also be guided. Moreover, the latter can be provided, on the side of the mobile frame 1', with one or two rotary rollers 54' placed in the alignment of the corresponding guiding rail 50 and capable to engage into a groove 17' of the mobile jaw 23' to prevent the chassis 51 from tipping over when planing the welded spot.

However, to avoid hyperstatic guiding of the chassis 51, the guiding part 54*a* of the lower planing assembly 53*a* is linked to the lower arm 51*a* by an elastic connection 56, bearing for instance on Belleville washers, which gives a certain freedom of vertical clearance to the planing assembly when engaging onto the welded spot, whereas the level is set by the upper jaw 24 as it has been already seen.

Thanks to these arrangements, guiding both planing assemblies 53*a*, 53*b* on the fixed jaws 24, 23 assures the distance between the cutting tools 53 and their positioning with respect to each face of the sheet whatever the thickness of the latter.

According to an embodiment represented on FIG. 12, this guiding process is performed not only vertically but also laterally, whereas each guiding part 54*a*, 54*b* is provided with lateral hooking parts working together with matching parts in the corresponding groove 18, 17 to ensure lateral and vertical clamping of the tool.

In such case, the working position of both planing assemblies 53*a*, 53*b* is fixed with respect to the fixed frame 1 and, the width of the pellets 53 must be determined to cover the welded spot whatever the cantilever distance selected.

As shown on FIGS. 9*d* to 9*f*, both grips 21, 22 of the clamping device 2 of the fixed frame 1 can be maintained closed on the first band M1, from the shearing phase 9*d*. During the following welding stage 9*e*, by displacement of the mobile frame 1', the head m2 of the following band M2, held between the grips of the mobile clamping device 2' contacts the tail m1 of the first band M1 and the flash welding process starts, whereas the mobile frame 1' progresses further in view of the forging operation.

Both bands M1 and M2 then constitute a single band the position of which is fixed by the grips 21, 22 of the fixed frame 1 which remain closed. After opening the mobile grips 2' (phase 9*f*), the mobile frame moves backward over the distance I' necessary to the passage of the planing device, the mobile grips 2' are closed again and, as the band is maintained perfectly in position, the beads can be planed off.

Because of the forging operation at the end of stage 9*e*, the weld is located very close to the fixed grips 21, 22 and this is the reason why, in the embodiment represented on the figures, the planing device 5 is guided by sliding on the jaws of the fixed frame 1.

Therefore, as indicated previously, the planing pellets must be sufficiently wide to cover the welded spot in all cases.

As the exact position of the welded spot with respect to the fixed grips 21, 22 depends on the band characteristics and on the welding and forging conditions, the welded line may be offset laterally on one side or the other of the middle plane of the planing tool if the relative position of the latter is determined in advance with respect to the fixed grips.

Moreover, in order to allow later rolling of the welded band, the fatty pads must be totally eliminated and it is even preferable to have the welded spot slightly hollow since the working face of the planing tools is slightly convex.

Thus, if the planing tool is too wide the machining depth can be excessive and the band may be torn apart, especially if both welded bands do not exhibit the same thickness.

It may be therefore preferable to reduce the width of the planing tools, which then must be correctly centred on the welded line. But the welded line must be pulled away slightly from the fixed grips in order to allow centring the said welded line on the mean plane of the planing device.

To do so, after the welding and forging phase 9*e*, we do not proceed exactly in the way exposed previously with reference to FIG. 9*f*. In such a case, indeed, the grips 2 of the fixed frame 1 are first open and both bands M1, M2 welded to one another are brought backward slightly in order to place the welded spot at a certain distance from the fixed grips 2 corresponding to a determined position of the mean plane of the planing tool.

This distance, which is measured with respect to the fixed frame 1 can be determined very accurately thanks to the position adjustment means of the mobile frame 1'.

The grips 21', 22' are then open to allow retraction of the mobile frame 1' over the distance necessary to the passage of the planing device 5 when the latter is centred on the fixed plane indicated previously and whose position is determined in advance in order to remain valid in all cases and for all the bands to be welded.

It should be noted that the thin adjustment means 37*b* of the longitudinal position of the tool-carriage 3 enable to position quite accurately the chassis 51 of the planing device 5 with respect to the fixed frame 1 so that the pellets 53*a*, 53*b* are perfectly centred on this fixed planing plane on which the welded line has been placed.

The mobile grips 21', 22' then close on the band (phase 9*g*) and, the single band M1, M2 being maintained perfectly in position, it is possible to proceed to the planing operation in a similar way to that indicated on FIG. 9h, whereas the planing tools 53a, 53b are, however, slightly away from the fixed grips 21, 22 at the distance indicated previously.

It can be seen that, thanks to the arrangements according to the invention, the fixed frame 1 serves, in both cases, as a single positioning reference, successively, for shearing, for welding and for planing, whereas the various toolings are brought one after the other into the common working position by simple displacement of the tool-carriage 3.

Figure 14:
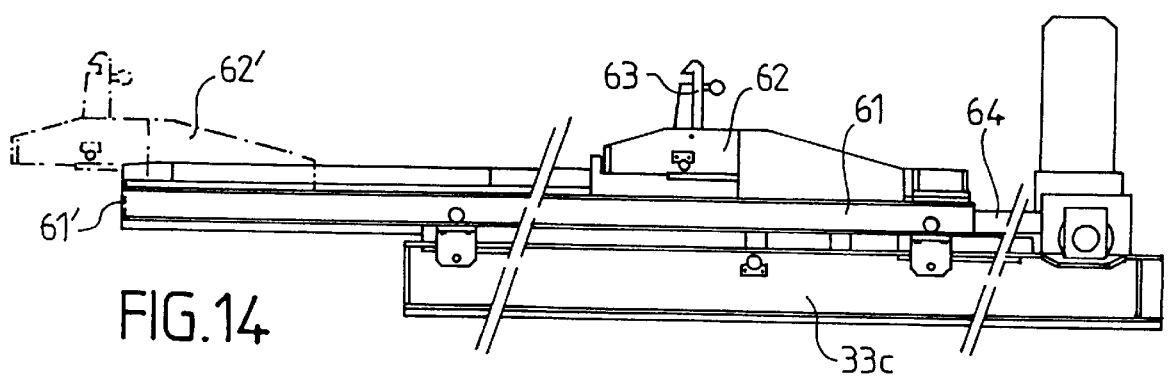
FIG. 14 is an elevation view of the grip replacement tool.

The latter is thus used as a kind of feeder which can, besides, carry other toolings such as for instance a replacement tooling 6, represented diagrammatically as a cross-sectional view on FIG. 5 and as an elevation view on FIG. 14.

This replacement tooling 6 is mounted on a supporting chassis 61 which may slide along a transversal guiding path 33c arranged on the carriage 3, for instance beside the transversal guiding path 33a of the shearing tooling 4.

Figure 13:
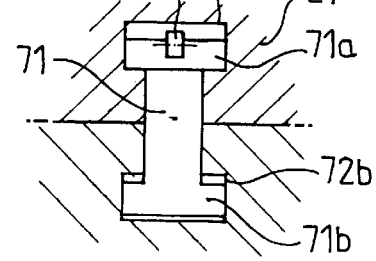
FIG. 13 is a detailed view of a clamping gib.

As indicated on FIG. 12 and, more in detailed, on FIG. 13, the lower grip 21 of the fixed clamping device 2 is fixed on the lower jaw 23 connected rigidly to the fixed frame 1, via a clamping system 7 consisting of two double-T gibs 71. The upper section of each gib 71, which exhibits a T-shaped section, can engage into a matching profile groove 72, arranged on the lower face of the lower grip 21, whereas the height of the groove 72 is greater than that of the T-shaped section of the gib 71, in order to create a slight vertical clearance.

Similarly, the lower section 71b of the gib 71 is enlarged in the form of a reverted T and is located in a transversal recess 72b arranged in the lower jaw 23 and whose height is slightly greater than that of the enlarged section 71b forming the piston of a double action jack, whereby both chambers thus arranged above and beneath the piston 71b can be supplied with fluid. Moreover, bearing rollers 73 whose axis is horizontal and parallel to the plane P2, are mounted on the external section 71a of the gib 71 and protrude slightly above the upper face of the latter in order to rest at the bottom of the groove 72 by lifting up the gib 71. In this position, the lower grip 21 resting on the rollers 73 comes away from the lower jaw 23 and can be removed by sliding transversally on the rollers 73, whereas the gibs 71 are used for transversal guiding of the said lower grip 21. Conversely, if the jack constituted by the gib 71 is fed into the other direction, the external upper section 71a of the gib 71 ensures clamping of the lower grip 21 against the lower jaw 23 thereby connecting both parts.

Consequently, the double T-shaped gibs 71 act simultaneously as clamping devices and as rolling and guiding devices for the lower grip 21 when dismantling the latter.

The upper grip 22 is also fixed in a removable way on the upper jaw 24 by a bayonet fastening system comprising at least two clamping jacks 75 each with a piston mounted in the jaw 24 and actuating a vertical stem capable at the same time of moving vertically and of revolving around its own axis. The lower extremity of the stem is provided with two aligned parts 76 forming hooks capable to engage into a cavity 77 arranged in the upper grip 22, passing through an oblong hole of corresponding shape. Thus, when the hooks 76 are aligned in the axis of the oblong hole, they can engage, actuated by the piston, into the cavity 77. The stem is then caused to rotate over a quarter turn and, by actuating the jack 75, the hooks 76 are raised and they, with the piston in high position, rest firmly at the bottom of the cavity 77 by clamping the grip 22 against the upper jaw 24.

Conversely, the upper grip 22 may be lowered using the jacks 75 in order to rest on the lower grip 21. After a quarter turn reverse rotation, the hooks 76 are raised in order to separate the grip 22 from the upper jaw 24.

The two grip 21, 22 assembly is raised by the gibs 71 and can then be rolled from the machine over the rollers 73.

According to a preferred embodiment represented on FIG. 14, the chassis 61 supporting the replacement tooling 6 consists of a horizontal table guided over rollers on profile fixed on the carriage 3 and forming a guiding path 33c. The table 61 moves transversally between a retracted position for which the table assembly 61 rests entirely on the carriage 3 and a forward position, represented on FIG. 13, for which the table 61 extends cantilever from the carriage 3, on the operator's side, to come close to the clamping devices, respectively fixed 2 and mobile 2'.

To remove both grips 21, 22, a hooking carriage 62 provided with a removable hook 63 is used to slide transversally on the table 61 along rails on the effects of control means not represented in detail, for instance a motor driven chain.

Besides, the carriage 62 is connected to the table 61 by a clip fastening system which is not represented, allowing the carriage 3 to drive the table 61 when moving transversally, but to move away from the table when the latter is blocked, for instance by a set of cams.

When the grips must be dismantled, for maintenance or replacement, longitudinal displacement of the carriage 3 under the action of the worm 37 brings the replacement device 6 into the working position centred on the working plane Q. Both grips 21, 22 of the clamping device are disconnected from the respective jaws in the way indicated above and rest on the gibs 71.

The disassembly carriage 62 is then commanded to move forward, driving the table 61 along. The latter rolls on the guiding path 33c and moves forward cantilever over a certain length, for instance approx. 1 m, to reach the position of FIG. 14 for which its front extremity 61' is close to the frame of the machine. Stops or cams, not represented, block the motion of the table 61 in this position. The carriage 62 than moves away from the table and rolls by itself forward on the table 61 whereas the latter is maintained cantilever on the carriage 3 by the rails 33c.

At the extremity of the table 61, the disassembly carriage is in the position 62' represented as a dotted line and the hooking device 63 is tipped over so that it hooks on a corresponding section of the lower jaw 21.

Moreover, the table 61 is provided with supporting and guiding rails 64 each placed in the alignment of one of the clamping gibs 71 of the lower jaw.

Since the mobile clamping device 2' is mounted on the mobile frame 1' in a completely identical way to that described for the fixed clamping device 2, the table 61 will be provided, normally, with two pairs of rails 64 placed respectively in the alignment of both pairs of gibs 71 fixed on the jaws 23, 23'. These rails 64 can be simple treated profiles on which slide the corresponding recesses 72 of the lower grips 21, 21'.

When the carriage 62 is brought backwards, it moves the grips over the table 61 which is maintained in blocked position with respect to the carriage 3 by a set of cams. At the end of its stroke, the carriage bumps into the table 61 which is then driven with the carriage 62 and the dismantled grips, whereby the assembly is rolled back onto the supporting carriage 3.

It can be thus clearly seen that the invention enables to simplify considerably all the operations necessary to weld two bands. The installation used is, indeed particularly compact and its operation can be controlled easily and with great accuracy, whereas all the movements are guided with respect to the fixed frame 1 which serves as a fixed reference for each operation.

But the invention is obviously not limited to the details of the embodiments which have just been described and which are liable to improvements or variations without departing from the scope thereof defined by the claims.

For example, in case of thickness variation, it is interesting to adjust the level of the second band with respect to the first, in order to distribute the difference of level over both faces, while maintaining the alignment of the mean horizontal planes.

To this end, as shown on FIG. 12, the mobile jaw 23' comprises advantageously an upper section 23'*a* of adjustable level on which are mounted the gibs 71'*a* fastening the lower mobile grip 21', and which consists of a plate bearing on the lower section 23'*b*, of constant level, using a thickness adjustable device 29, for instance a wedge consisting of at least two sections 29'*a*, 29'*b* separated by a tilted face, interposed between both sections 23'*b*, 23'*a* of the mobile jaw 23'. The displacement of the wedge enables to adjust, with accuracy, the height of the adjustable section 23'*a* and, consequently, of the lower grip 21' with respect to the lower section 23'*b*.

It can also be seen on FIG. 12, that each lower grip 21, 21', consists of two superimposed sections, respectively a lower section bearing on the lower jaw 23, 23' and an upper section contacting the band, on which is arranged the grip properly speaking. An electric insulating layer 27 separates both sections.

Besides, an insulating layer 27 is interposed between each upper grip 22, 22' and the corresponding upperjaw.

Thus, as indicated diagrammatically on FIG. 4, only the grips, which serve as electrodes, are supplied electrically, whereby the conductors 80, 80', connected directly to the upper grips 22, 22' are also insulated.

The path followed by the electric power circuit may advantageously be designed so that the consumed reactive power is as small as possible.

Besides, taking into account that all the operations necessary to the welding process are performed in a limited area, between the mobile frame 1' and the fixed frame 1 which serves as a reference, it is possible to concentrate at this point all the means for disposing of the welding pollutants or waste.

For example, the chassis 41 of the shearing tooling 4 is advantageously provided with a channel 46 opening behind the blades 43 and leading beneath the chassis in order to evacuate the shearing refuse, as they build up, toward a collection device arranged in the foundation block 10, below the fixed frame 1.

Taking into account that planing and cutting are performed substantially in the same position with respect to the fixed frame, the welding refuse such as slags and planing chips can be evacuated at the same location.

To this end, as shown on FIG. 10, both planing tools 53*a*, 53*b*, are provided, on their front face, with a brushing system 84 similar to stainless steel strips which, during transversal displacement of the chassis 51, rub the extremities of the grips in order to remove the slags caused by electric sparks.

Moreover, two blowing ramps 85 are mounted on both arms 51*a*, 51*b* of the chassis 51, behind the planing tools 53*a*, 53*b*, in order to evacuate the chips as they build up.

Thus, the planing tools are cleaned before coming back onto the tool-carriage 3, avoiding any deposits on the rails 31 or the guiding paths of particles such as chips or slags which might have disturbed the displacement of the carriage 3 and of the toolings.

Moreover, for easy maintenance and guaranteed cleanliness of the rails, the carriage 3 is advantageously associated with two telescopic cover plate assemblies 83, 83' extending from the carriage 3, upstream and downstream, as indicated diagrammatically on FIG. 5.

Each telescopic assembly 83 also represented on FIG. 1 consists of a number of cover plates threaded into one another and covering the whole displacement and guiding system of the carriage 3, particularly the rails 31 and the worm 37. The extremity elements of each set of cover plates 83, 83' are fixed respectively, on the corresponding side of the carriage 3 and on the extremity of the guiding path so that the latter is covered permanently by the cover plates or the carriage 3, whereas each assembly extends or retracts according to the position of the carriage 3.

It should also been noted that, if it is particularly advantageous to use, for cutting both edges to be welded, transversally movable double shears, it would be possible as well, to use fixed guillotine shears, placed inside the frame, whereas the welding process is performed by transversal displacement of a welding torch mounted on a transversally movable chassis of the tool-carriage 3.

To this end, generally, thanks to using the tool-carriage enabling to place various toolings into working position one after the other, the invention enables to adapt the machine to the requirements quite easily and, especially, to improve the performances of an existing installation.

We claim:

1. A splicing machine for connecting metallic bands running in succession along a mean plane substantially horizontal and along a longitudinal running axis comprising:

a fixed frame centred on the running axis and on which is mounted a first two-grip clamping device for clamping the downstream extremity, in the running direction, of a first band, a mobile frame centred on the running axis and movable parallel to the latter with respect to the fixed frame, whereas the said movable frame carries a second two-grip clamping device for clamping the upstream extremity of a second band following the first one and, at least three toolings for the connection of the second band to the first one, respectively, a cutting tooling comprising two devices for simultaneous shearing of two opposite parallel edges, respectively downstream and upstream, on the extremities of both bands, once the latter have been clamped respectively in the first and second clamping devices, whereas each edge is shorn off at a cantilever distance determined with respect to the corresponding clamping grips, a butt-welding tooling of both bands after bringing the latter closer to one another by moving the mobile frame, a planing tooling for removing the matter in excess on both faces of the welded bands, wherein it is provided:

a tool-carriage mounted to slide on a longitudinal guiding path extending on a first side of both frames, parallel to the running axis, at least two transversal guiding paths arranged beside one another on the tool-carriage and perpendicular to the running axis, at least two supporting chassis, each to support one of the connecting toolings, whereby the said supporting chassis are mounted to slide, respectively, each on one of the said transversal guiding paths, means to control the sliding motion of the tool-carriage along the longitudinal guiding path, to position one of the transversal guiding paths, substantially in a common working position, centred on a mean plane orthogonal to the running axis, means to control the transversal sliding motion of each of the said chassis of the supporting tooling, one after the other, on the corresponding transversal guiding path, after placing the said path into the said common working position, in order to actuate the tooling carried by the said chassis and to perform the corresponding operation, parallel to the same mean working plane, on the opposite edges, respectively downstream and upstream, of both bands.

2. A splicing machine according to claim 1, wherein the means to control the transversal sliding motion of the tooling supporting chassis comprise common means arranged at the level of the common working position and movable perpendicular to the running axis while bearing upon a fixed structure, whereby the said common means are provided with a pick-up device capable to engage in a removable way onto a corresponding matching section of each tooling supporting chassis when the said chassis is in the common working position.

3. A splicing machine according to claim 1, wherein the tool-carriage is mounted to move on a lower longitudinal sliding path arranged on a floor beside the machine and associated with an upper parallel sliding path arranged on a supporting structure and onto which engages a corresponding guiding section by a sliding motion, of matching shape, arranged on each tooling supporting chassis, whereas the said upper longitudinal path comprises two sections extending respectively on both sides of a stop located at the level of the common working plane and whose width is sufficient to enable transversal displacement of either tooling supporting carriage.

4. A splicing machine according to claim 3, wherein it is provided common means for controlling the sliding motion of each supporting chassis, comprising of at least one jack centred on an axis parallel to the mean working plane and comprising a fixed element mounted on the supporting structure and a mobile element carrying a pick-up device consisting of a hooking head whose profile, in transversal section, is identical to that of the upper longitudinal path so that, in the common working position of each tooling supporting chassis, the guiding section of each tooling supporting chassis engages onto the hooking head of the jack.

5. A splicing machine according to claim 1, wherein the control means of the longitudinal sliding motion of the tool-carriage comprises a thin adjustment device for accurate positioning of at least one transversal guiding path and of the corresponding supporting chassis with respect to the mean working plane.

6. A splicing machine according to claim 2, wherein the pick-up device of the transversal sliding common means engages onto a matching section of each supporting chassis with a certain clearance in the longitudinal direction enabling accurate positioning of the said chassis with respect to the mean working plane.

7. A splicing machine according to claim 1, wherein the cutting tooling comprises two shearing devices maintained at fixed distance for cutting, respectively, the downstream extremity and the upstream extremity of both bands maintained, respectively, by the first and the second clamping devices, along two parallel shearing lines, spaced from one another by a constant distance.

8. A splicing machine according to claim 7, wherein both shearing devices are mounted on the tool-carriage, the adjustment device determines, by longitudinal displacement of the carriage, the accurate positioning of a first shearing device with respect to the first clamping device in order to adjust a set cantilever distance on the downstream extremity of the first band, between the corresponding shearing line and the first clamping device and that the machine comprises means for longitudinal displacement of the mobile frame with respect to the fixed frame which enables accurate positioning of the second clamping device with respect to the first in order to adjust a set cantilever distance between the second clamping device and the shearing line at the upstream extremity of the second band.

9. A splicing machine according to claim 7, wherein the cutting tooling comprises double shears having two shearing devices mounted on a common supporting chassis and delineating respectively two parallel shearing planes spaced by a fixed distance.

10. A splicing machine according to claim 9, wherein the common supporting chassis is mounted to slide on the tool-carriage perpendicular to the running axis and comprises two arms, respectively upper and lower, extending respectively above and beneath the running plane of the band and each shearing device comprises a pair of circular blades, respectively upper and lower, mounted to rotate around axes parallel to the running direction, respectively on both arms of the chassis, whereas the upper arm carries both upper blades and the lower arm carries both lower blades, whereby both blades of each pair overlap each other partially on a shearing plane perpendicular to the running direction of the band.

11. A splicing machine according to claim 10, wherein both pairs of blades are placed in advance on the side opposite the tool-carriage whereas the supporting chassis is moved forward before the second band is placed in position and the shearing process takes place by a pulling action whereas the supporting chassis is brought onto the carriage, after moving the second band forward, closing the clamping devices and adjusting the cantilever distances at the extremities, respectively downstream and upstream of both bands.

12. A splicing machine according to claim 11, wherein the upper blades of both pairs are supported by a vertical post articulated around a horizontal axis on the supporting arm in order to pivot slightly from a first pull-shearing position, for which the axis of the upper blade is offset backwards with respect to the axis of the lower blade, in the running direction of the chassis toward the carriage, whereas the vertical post bears on a fixed stop of the supporting arm, to a second push-shearing position for which the axis of the upper blade is retracted at least at the level of the axis of the lower blade when the chassis is pushed away toward the bands, whereas the vertical post bears on an adjustable stop, whereby pull-shearing takes place in the first position of the post, before the bands are welded, but push-shearing can also be performed after welding, in the second position, of the post in case when the bands must be separated for re-welding.

13. A splicing machine according to claim 1, wherein each clamping device comprises a pair of jaws, respectively lower and upper, placed on both sides of the mean running plane of the bands, whereby one of the jaws of each pair is fixed on the corresponding frame and the other jaw is mounted movable vertically on the said corresponding frame, each jaw being provided with a removable clamping grip.

14. A splicing machine according to claim 13, wherein each clamping device comprises a lower jaw fixed on the corresponding frame and provided with a lower grip mounted to slide perpendicular to the running direction, on the said lower jaw and an upper jaw movable vertically and provided with a removable upper grip fixed in a removable way on the said upper jaw in order to be detached from the latter and to rest of the lower grip, whereas the two-grip assembly can thus be removed from the machine and replaced into the latter whereas the lower grip slides transversally onto the lower jaw.

15. A splicing machine according to claim 14, wherein at least one of both jaws is provided with at least one double T gib, mobile vertically, extending along a direction perpendicular to the running direction, and with a T-shaped external section, protruding with respect to the jaw, to engage into a matching groove of the corresponding grip and a reverted T-shaped internal section placed in a transversal recess arranged in the said lower jaw and constituting a piston delineating two chambers of a double-action cylinder, capable of been supplied with fluid, respectively on each side of the said piston respectively, for clamping the grip onto the corresponding jaw and for moving the said grip away.

16. A splicing machine according to claim 15, wherein the lower jaw is fixed to the frame and is provided with two mobile gibs for clamping the lower grip and in that the upper T-shaped section of each mobile gib is provided, on its upper face, with at least two track rollers bearing on the bottom of the groove in order to support the said grip whereas the latter may raise the gibs by sliding into upward position.

17. A splicing machine according to claim 14, wherein the upper jaw is provided with a removable fastening means for the upper grip comprising at least two clamping jacks, each with a stem mounted to pivot around a vertical axis, whereas each stem is provided, at its extremity, with two aligned sections forming hooks, capable to engage into a cavity arranged in the grip by passing through an oblong hole of corresponding shape and to force against the bottom of the said cavity, on both sides of the oblong hole, after rotation of the stem, in order to clamp the grip onto the jaw using the jacks.

18. A splicing machine according to claim 1, wherein it is provided with a replacement tooling comprising at least one sliding hooking device mounted on a transversal guiding path arranged on the tool-carriage and capable to engage in a removable way, at least on one of the grip of each clamping device in order to extract from the frame the said grip and to bring it onto the tool-carriage by sliding on the transversal guiding path and, conversely, to put a replacement grip back into the frame.

19. A splicing machine according to claim 18, wherein the upper grip is mounted in a removable way on the upper jaw and rests on the lower grip for simultaneous disassembly and reassembly of both grips using the replacement tooling.

20. A splicing machine according to claim 18, wherein the hooking device of the grips is mounted on a supporting table movable transversally on the transversal guiding path of the tool-carriage between a forward position directed toward both frames for hooking the grips and a retracted position on the tool-carriage for conveying the dismantled grips.

21. A splicing machine according to claim 13, wherein the fixed height jaw of at least one of both clamping devices is associated with an adjustable block, interposed between at least a section of the said lower jaw and the corresponding grip in order to align the mean planes of both bands.

22. A splicing machine according to claim 1, wherein the welding tooling comprises of both pairs of grips of both clamping devices, respectively, of both bands, whereby the said pairs of grips are connected respectively to both poles of a source of electric current for flash butt-welding.

23. A splicing machine according to claim 22, wherein at least the sections of each clamping grip in contact with the band are separated, respectively, from the corresponding jaw by an electrically insulating layer and are connected, respectively, to each of both poles of the source of electric current via electrically insulated circuits in order to perform the welding operation by passing the current exclusively through the said grips and both bands.

24. A splicing machine according to claim 1, wherein the welding tooling comprises laser, plasma or arc-welding torch, mounted on a supporting chassis movable on a transversal guiding path arranged on the tool-carriage for butt-welding of the edges, respectively downstream and upstream, of both bands.

25. A splicing machine according to claim 1, wherein the positioning adjustments, at east longitudinal, of all the toolings, are performed from the fixed frame serving as a reference for all the operations.

26. A splicing machine according to claim 25, wherein after clamping the downstream extremity of the first band, the first clamping device remains in clamped position until completion of the connection operations, whereas the fixed frame serves as a position reference for all the toolings and all the operations.

27. A splicing machine according to claim 25, wherein on completion of the welding, the first clamping device mounted on the fixed frame opens, the second clamping device remains in clamped position, the mobile frame moves back for centring the welded edges on the flattening tooling, the clamping device of the fixed frame closes again and the clamping device of the mobile frame opens and retracts to allow passage of the flattening tooling.

28. A splicing machine according to claim 1, wherein each clamping device comprising a fixed jaw and a mobile jaw, at least the supporting chassis of the flattening tooling is provided with at least one horizontal guiding part capable to engage, by transversal displacement of the chassis, on a matching profile section arranged at least on the mobile jaw of the clamping device mounted on the fixed frame and forming at least a horizontal guiding rail for automatic adjustment of the flattening tooling according to the thickness of the welded band.

29. A splicing machine according to claim 28, wherein at least one horizontal section for guiding the flattening tooling is mounted to slide perpendicular to the running direction, on the matching guiding section arranged at least on the mobile jaw of the fixed clamping device and the flattening tooling covers, on both faces of the welded bands, a band of sufficient width to cover the welded spot, taking into account the adjustment possibilities of the cantilever distance between the first clamping device and the downstream edge of the first band upon completion of the shearing process.

30. A splicing machine according to claim 1, wherein the flattening tooling is a planing tooling comprising two sets of cutting pellets located respectively above and beneath the running plane in order to plane both faces of the welded spot after completion of the welding process.

31. A splicing machine according to claim 1, wherein both clamping devices, respectively fixed and mobile, are each provided with a pair of mobile flaps mounted to pivot, respectively, on the four clamping grips and associated with means to control the tipping of the said flaps between a raised position for positioning adjustment and passage of the toolings and a retracted position in order to delineate a confined space in which a neutral or reducing gas can be injected to limit oxidation during the welding process, whereas the opposite flaps overlap each other partially.

* * * * *